United States Patent
Decor et al.

(10) Patent No.: US 10,757,939 B2
(45) Date of Patent: Sep. 1, 2020

(54) INSECTICIDAL AND NEMATOCIDAL ACTIVE INGREDIENT COMBINATIONS

(71) Applicant: Bayer CropScience Aktiengesellschaft, Monheim (DE)

(72) Inventors: Anne Decor, Langenfeld (DE); Eike Kevin Heilmann, Duesseldorf (DE); Axel Trautwein, Duesseldorf (DE); Reiner Fischer, Monheim (DE); Hartwig Dauck, Burscheid (DE); Leonardo Pittá, Leverkusen (DE); Wolfram Andersch, Bergisch Gladbach (DE); Wolfgang Thielert, Odenthal (DE); Marita John, Bottrop (DE); Joerg Greul, Leverkusen (DE); Johannes-Rudolf Jansen, Monheim (DE)

(73) Assignee: Bayer CropScience Aktiengesellschaft, Monheim am Rhein (DE)

(*) Notice: Subject to any disclaimer, the term of this patent is extended or adjusted under 35 U.S.C. 154(b) by 0 days.

(21) Appl. No.: 16/434,889

(22) Filed: Jun. 7, 2019

(65) Prior Publication Data
US 2019/0281827 A1 Sep. 19, 2019

Related U.S. Application Data

(63) Continuation of application No. 15/129,319, filed as application No. PCT/EP2015/056219 on Mar. 24, 2015, now abandoned.

(30) Foreign Application Priority Data

Mar. 27, 2014 (EP) .................................. 14161863

(51) Int. Cl.
| | | |
|---|---|---|
| *A01N 43/647* | (2006.01) | |
| *A01N 57/12* | (2006.01) | |
| *A01N 47/10* | (2006.01) | |
| *A01N 41/10* | (2006.01) | |
| *A01N 43/12* | (2006.01) | |
| *A01N 43/56* | (2006.01) | |
| *A01N 43/50* | (2006.01) | |
| *A01N 43/78* | (2006.01) | |
| *A01N 43/90* | (2006.01) | |
| *A01N 43/40* | (2006.01) | |

(52) U.S. Cl.
CPC .......... *A01N 43/647* (2013.01); *A01N 41/10* (2013.01); *A01N 43/12* (2013.01); *A01N 43/40* (2013.01); *A01N 43/50* (2013.01); *A01N 43/56* (2013.01); *A01N 43/78* (2013.01); *A01N 43/90* (2013.01); *A01N 47/10* (2013.01); *A01N 57/12* (2013.01)

(58) Field of Classification Search
None
See application file for complete search history.

(56) References Cited

U.S. PATENT DOCUMENTS

| | | | |
|---|---|---|---|
| 9,802,899 | B2 | 10/2017 | Heilmann et al. |
| 10,435,374 | B2* | 10/2019 | Heilmann ............... A01N 43/58 |
| 2014/0056853 | A1 | 2/2014 | Marrone et al. |
| 2017/0305864 | A1* | 10/2017 | Heilmann ............ A01N 43/653 |
| 2019/0367459 | A1* | 12/2019 | Heilmann ............ C07D 417/12 |
| 2019/0367460 | A1* | 12/2019 | Heilmann ............ C07D 231/56 |

FOREIGN PATENT DOCUMENTS

| | | |
|---|---|---|
| DE | 101 34 720 A1 | 7/2002 |
| WO | 2007/037543 A1 | 4/2007 |
| WO | 2014/053450 A1 | 4/2014 |

OTHER PUBLICATIONS

D'Anna F et al., "On the Application of the Extended Fujita-Nishioka Equation to Polysubstituted Systems. A Kinetic Study of the Rearrangement of Several Poly-Substituted Z-Arylhydrazones of 3-Benzoyl-5-Phenyl-1,2,4-Oxadiazole Into 2-Aryl-4-Benzoylamino-5-Phenyl-1,2,3-Triaz Oles in Dioxane/Water", Tetrahedron, Jan. 3, 2005, pp. 167-178, vol. 61, No. 1, Elsevier Science Publishers, Amsterdam, NL.
Serenade Soil, Bayer, XP055121987, Jun. 5, 2014, Retrieved from the Internet: URL: http://www.agrian.com/pdfs/Serenade_Soil_Label1h.pdf.
International Search Report of International Patent Application No. PCT/EP2015/056219 dated May 20, 2015.

* cited by examiner

*Primary Examiner* — Po-Chih Chen
(74) *Attorney, Agent, or Firm* — McBee Moore & Vanik IP, LLC

(57) ABSTRACT

The present invention relates to active ingredient combinations which comprise a known compound of the formula (I)

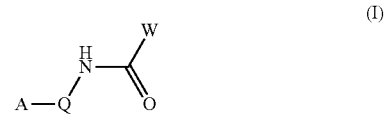

on the one hand and one or more other active pesticidal ingredients on the other and which are suitable for controlling animal and microbial pests.

18 Claims, No Drawings

INSECTICIDAL AND NEMATOCIDAL ACTIVE INGREDIENT COMBINATIONS

CROSS-REFERENCE TO RELATED APPLICATIONS

This application is a continuation of U.S. patent application Ser. No. 15/129,319 filed 26 Sep. 2016, which is a National Stage entry of International Application No. PCT/EP2015/056219, filed Mar. 24, 2015, which claims priority to European Patent Application No. 14161863.7, filed Mar. 27, 2014.

Each of these prior applications is incorporated by reference in their entireties

BACKGROUND

Field of Invention

This specification relates to mixtures of compounds of the formula (I) elucidated below with at least one further active compound which may preferably be an insecticide or a nematocide or an acaricide or a biological control agent. These mixtures (active ingredient combinations) are suitable for controlling animal pests and also act as plant strengtheners.

Description of Related Art

The heterocyclic compounds of the formula (I) are disclosed in PCT/EP2014/070371 where their use for controlling nematodes and animal pests is described. The acaricidal and/or insecticidal and/or nematocidal activity and/or spectrum and/or crop compatibility of these compounds, especially with regard to crop plants, is not always adequate, however.

SUMMARY

It has now been found that active ingredient combinations (active ingredient mixtures) comprising a compound of the formula (I) and one or more compounds from groups (I-1) to (I-29) described later on below, and/or one or more biological control agents from groups (B-1) to (B-6) described later on below and/or one or more compounds from groups of mixing partners stated as preferred later on below, are synergistically active and are suitable for controlling animal pests and also act as plant strengtheners.

The active ingredient combinations of the invention comprise at least one and preferably precisely one compound of the formula (I),

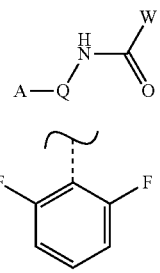

(I)

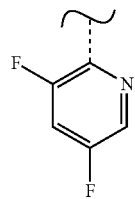

A-1.0

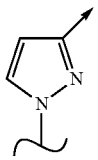

A-2.0

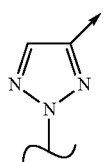

Q-1.0

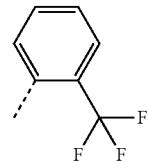

Q-2.0 in which A is A-1.0 or A-2.0 in which the dotted line represents the bond to the N atom of Q;

Q is Q-1.0 or Q-2.0 in which the nitrogen is attached to ring A and the arrow in each case represents the bond to the NHCO moiety;

W represents a radical from the group consisting of W1 to W11

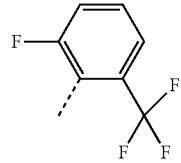

W1

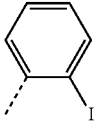

W2

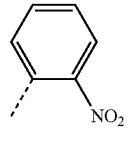

W3

W4

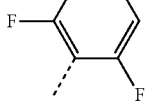

W5

W6

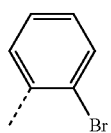

W7

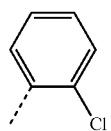

W8

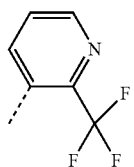

W9

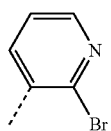

W10

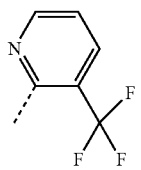

W11

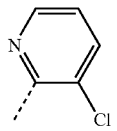

DETAILED DESCRIPTION OF A PREFERRED EMBODIMENT

In one embodiment the active ingredient combinations of the invention comprise the compound of the formula (I), in which A is A-1.0, Q is Q-1.0 and W represents W1 (Compound (Ia).

In another embodiment the active ingredient combinations of the invention comprise the compound of the formula (I), in which A is A-2.0, Q is Q-1.0 and W represents W1 (Compound (Ib).

In another embodiment the active ingredient combinations of the invention comprise the compound of the formula (I), in which A is A-1.0, Q is Q-2.0 and W represents W1 (Compound (Ic).

Taking the above into account compound (Ia) has the following structure:

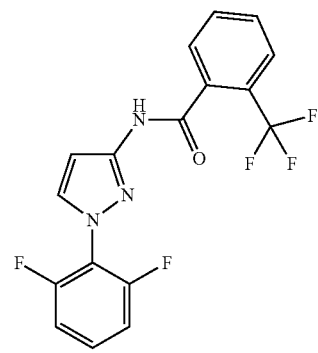

(Ia)

Compound (Ib) has the following structure:

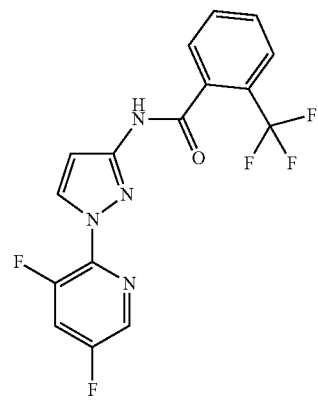

(Ib)

Compound (Ic) has the following structure:

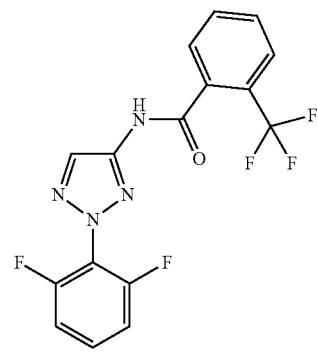

(Ic)

The active ingredient combinations of the invention further comprise one or more compounds from groups (I-1) to (I-29) described below and/or one or more biological control agents from groups (B-1) to (B-6) and/or one or more compounds from groups of mixing partners stated as preferred later on below.

Active ingredient combinations of the invention comprise, as well as the compound (Ia), one or more compounds from groups (I-1) to (I-29) described below, and/or one or more biological control agents from groups (B-1) to (B-6), and/or one or more compounds from other groups of mixing partners stated as being preferred.

Further active ingredient combinations of the invention comprise, as well as the compound (Ib), one or more compounds from groups (I-1) to (1-29) described below, and/or one or more biological control agents from groups (B-1) to (B-6), and/or one or more compounds from other groups of mixing partners stated as being preferred.

Further active ingredient combinations of the invention comprise, as well as the compound (Ic), one or more compounds from the groups (I-1) to (1-29) described below, and/or one or more biological control agents from groups (B-1) to (B-6), and/or one or more compounds from other groups of mixing partners stated as being preferred.

The active ingredients in category (I-1) to (1-29) identified here by their common names are known and are described for example in the pesticide handbook ("The Pesticide Manual", 16th Edn., British Crop Protection Council2012) or can be looked up on the Internet (e.g. http://www.alanwood.net/pesticides).

(I-1) Acetylcholinesterase (AChE) inhibitors, such as, for example carbamates, for example alanycarb, aldicarb, bendiocarb, benfuracarb, butocarboxim, butoxycarboxim, carbaryl, carbofuran, carbosulfan, chlorpyrifos, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb or organophosphates, for example acephate, azamethiphos, azinphos-ethyl, azinphosmethyl, cadusafos, chlorethoxyfos, chlorfenvinphos, chlormephos, chloropyrifos, chloropyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl)salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(I-2) GABA-gated chloride channel antagonists, such as, for example cyclodiene organochlorins, e.g. chlordane and endosulfan or phenylpyrazoles (fiprole), e.g. ethiprole and Fipronil.

(I-3) Sodium channel modulators/voltage-dependent sodium channel blockers, such as, for example pyrethroids, e.g. acrinathrin, allethrin, d-cis-trans allethrin, d-trans allethrin, bifenthrin, bioallethrin, bioallethrin s-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomer], deltamethrin, empenthrin [(EZ)-(1R)-isomer], esfenvalerate, etofenprox, fenpropathrin, fenvalerate, flucythrinate, flumethrin, taufluvalinate, taufluvalinate, halfenprox, imiprothrin, kadethrin, momfluorothrin, permethrin, phenothrin [(1R)-trans-isomer], prallethrin, pyrethrins (pyrethrum), resmethrin, silafluofen, tefluthrin, tetramethrin, tetramethrin [(1R)-isomer)], tralomethrin and transfluthrin or DDT or methoxychlor.

(I-4) Nicotinergic acetylcholine receptor (nAChR) agonists, such as, for example neonicotinoids, e.g. acetamiprid, clothianidin, dinotefuran, imidacloprid, nitenpyram, thiacloprid, thiamethoxam, nicotine, sulfoxaflor, and flupyradifurone.

(I-5) Nicotinergic acetylcholine receptor (nAChR) allosteric activators, such as, for example spinosyns, e.g. spinetoram and spinosad.

(I-6) Chloride channel activators, such as, for example avermectins/milbemycins, e.g. abamectin, emamectin benzoate, lepimectin and milbemectin.

(I-7) Juvenile hormone imitators, such as, for example juvenile hormone analogues, e.g., hydroprene, kinoprene and methoprene or fenoxycarb or pyriproxyfen.

(I-8) Active ingredients with unknown or non-specific mechanisms of action, such as, for example alkyl halides, e.g. methyl bromide and other alkyl halides; or chloropicrin or sulphuryl fluoride or borax or tartar emetic.

(I-9) Selective antifeedants, e.g. pymetrozine or flonicamid.

(I-10) Mite growth inhibitors, e.g. clofentezine, hexythiazox and diflovidazin or etoxazole.

(I-11) Microbial disruptors of the insect gut membrane, e.g. *Bacillus thuringiensis* subspecies *israelensis, Bacillus sphaericus, Bacillus thuringiensis* subspecies *aizawai, Bacillus thuringiensis* subspecies *kurstaki, Bacillus thuringiensis* subspecies tenebrionis and BT plant proteins: Cry1Ab, Cry1Ac, Cry1Fa, Cry2Ab, mCry3A, Cry3Ab, Cry3Bb, Cry34/35Ab1.

(I-12) Oxidative phosphorylation inhibitors, ATP disruptors, such as, for example, diafenthiuron or organotin compounds, e.g. azocyclotin, cyhexatin and fenbutatin oxide or propargite or tetradifon.

(I-13) Oxidative phosphorylation decouplers acting by interrupting the H proton gradient, such as, for example, chlorfenapyr, DNOC and sulfluramid.

(I-14) Nicotinergic acetylcholine receptor antagonists, such as, for example, bensultap, cartap hydrochloride, thiocyclam and thiosultap-sodium.

(I-15) Chitin biosynthesis inhibitors, type 0, such as, for example, bistrifluron, chlorfluazuron, diflubenzuron, flucycloxuron, flufenoxuron, hexaflumuron, lufenuron, novaluron, noviflumuron, teflubenzuron and triflumuron.

(I-16) Chitin biosynthesis inhibitors, type 1, such as, for example, buprofezin.

(I-17) Active moulting disruptor ingredients, dipteran, such as, for example, cyromazine.

(I-18) Ecdysone receptor agonists, such as, for example, chromafenozide, halofenozide, methoxyfenozide and tebufenozide.

(I-19) Octopaminergic agonists, such as, for example, amitraz.

(I-20) Complex III electron transport inhibitors, such as, for example, hydramethylnon or acequinocyl or fluacrypyrim.

(I-21) Complex I electron transport inhibitors, for example METI acaricides, e.g. fenazaquin, fenpyroximate, pyrimidifen, pyridaben, tebufenpyrad and tolfenpyrad or rotenone (Derris).

(I-22) Voltage-dependent sodium channel blockers, e.g. indoxacarb or metaflumizone.

(I-23) Inhibitors of acetyl CoA carboxylase, such as, for example tetronic and tetramic acid derivatives, e.g. spirodiclofen, spiromesifen and spirotetramat.

(I-24) Complex IV electron transport inhibitors, such as, for example, phosphines, e.g. aluminium phosphide, calcium phosphide, phosphine and zinc phosphide or cyanide.

(I-25) Complex II electron transport inhibitors, such as, for example, cyenopyrafen and cyflumetofen.

(I-28) Ryanodine receptor effectors, such as, for example diamides, e.g. chlorantraniliprole, cyantraniliprole and flubendiamide, (I-29) Other active ingredients with unknown active mechanism, such as, for example, afidopyropen, afoxolaner, azadirachtin, benclothiaz, benzoximate, bifenazate, bromopropylate, chinomethionat, cryolite, cyclaniliprole, cycloxaprid, cyhalodiamide, dicloromezotiaz, dicofol, diflovidazin, fluensulfone, flometoquin, flufenerim, flufenoxystrobin, flufiprole, fluhexafon, fluopyram, fluralaner, fufenozide, guadipyr, heptafluthrin, imidaclothiz, iprodione, meperfluthrin, paichongding, pyflubumide, pyridalyl, pyrifluquinazon, pyriminostrobin, tetramethylfluthrin, tetraniliprole, tetrachlorantraniliprole, triflumezopyrim and iodomethane, tioxazafen and dimethyldisulfide, thymol, harpin and active compounds below: 1-{2-fluoro-4-methyl-5-[(2,2,2-trifluoroethyl) sulphinyl] phenyl}-3-(trifluoromethyl)-1H-1,2,4-triazole-5-amine (known from WO2006/043635), {1 '-[(2E)-3-(4-chlorophenyl)prop-2-en-1-yl]-5-fluorospiro [indol-3,4'-piperidin]-1(2H)-yl}(2-chloropyridin-4-yl)methanone (known from WO2003/106457), 2-chloro-N-[2-{1-[(2E)-3-(4-chlorophenyl)prop-2-en-1-yl]piperidin-4-yl}-4-(trifluoromethyl)phenyl]isonicotinamide (known from WO2006/003494), 3-(2,5-dimethylphenyl)-4-hydroxy-8-methoxy-1,8-diazaspiro [4.5]dec-3-en-2-one (known from WO2009/049851), 3-(2,5-dimethylphenyl)-8-methoxy-2-oxo-1,8-diazaspiro [4.5]dec-3-en-4-yl-ethylcarbonate (known from WO2009/049851), 4-(but-2-yn-1-yloxy)-6-(3,5-dimethylpiperidin-1-yl)-5-fluoropyrimidine (known from WO2004/099160), 4-(but-2-yn-1-yloxy)-6-(3-chlorophenyl)pyrimidine (known from WO2003/076415), PF1364 (CAS Reg. No. 1204776-60-2), methyl 2-[2-({[3-bromo-1-(3-chloropyridin-2-yl)-1H-pyrazol-5-yl]carbonyl}amino)-5-chloro-3-methylbenzoyl]-2-methylhydrazinecarboxylate (known from WO2005/085216), methyl 2-[2-({[3-bromo-1-(3-chloropyridin-2-yl)-1H-pyrazol-5-yl]carbonyl}amino)-5-cyano-3-methylbenzoyl]-2-ethylhydrazinecarboxylate (known from WO2005/085216), methyl 2-[2-({[3-bromo-1-(3-chloropyridin-2-yl)-1H-pyrazol-5-yl]carbonyl}amino)-5-cyano-3-methylbenzoyl]-2-methylhydrazinecarboxylate (known from WO2005/085216), methyl 2-[3,5-dibromo-2-({[3-bromo-1-(3-chloropyridin-2-yl)-1H-pyrazol-5-yl]carbonyl}amino)benzoyl]-2-ethylhydrazinecarboxylate (known from WO2005/085216), N-[2-(5-amino-1,3,4-thiadiazol-2-yl)-4-chloro-6-methylphenyl]-3-bromo-1-(3-chloropyridin-2-yl)-1H-pyrazole-5-carboxamide (known from CN102057925), 8-chloro-N-[(2-chloro-5-methoxyphenyl)sulphonyl]-6-(trifluoromethyl)imidazo [1,2-a]pyridine-2-carboxamide (known from WO2010/129500), 4-[5-(3,5-dichlorophenyl)-5-(trifluoromethyl)-4,5-dihydro-1,2-oxazol-3-yl]-2-methyl-N-(1-oxidothietan-3-yl)benzamide (known from WO2009/080250), N-[(2E)-1-[(6-chloropyridin-3-yl)methyl]pyridin-2(1H)-ylidene]-2,2,2-trifluoroacetamide (known from WO2012/029672), 1-[(2-chloro-1,3-thiazol-5-yl)methyl]-4-oxo-3-phenyl-4H-pyrido [1,2-a]pyrimidin-1-ium-2-olate (known from WO2009/099929), 1-[(6-chloropyridin-3-yl)methyl]-4-oxo-3-phenyl-4H-pyrido [1,2-a]pyrimidin-1-ium-2-olate (known from WO2009/099929), 4-(3-{2,6-dichloro-4-[(3,3-dichloroprop-2-en-1-yl)oxy] phenoxy}propoxy)-2-methoxy-6-(trifluoromethyl) pyrimidine (known from CN101337940), N-[2-(tert-butylcarbamoyl)-4-chloro-6-methylphenyl]-1-(3-chloropyridin-2-yl)-3-(fluoromethoxy)-1H-pyrazole-5-carboxamide (known from WO2008/134969, 3-[benzyl (methyl)amino]-N-[2-bromo-4-[1,2,2,2-tetrafluoro-1-(trifluoromethyl)ethyl]-6-(trifluoromethyl)phenyl]-2-fluorobenzamide (known from WO 2010018714), butyl [2-(2,4-dichlorophenyl)-3-oxo-4-oxaspiro [4.5]dec-1-en-1-yl] carbonate (known from CN 102060818), 4-[5-(3,5-dichlorophenyl)-5-(trifluoromethyl)-4H-isoxazol-3-yl]-N-[(Z)-methoxyiminomethyl]-2-methyl-benzamide (known from WO2007/026965), 3E)-3-[1-[(6-chloro-3-pyridyl)methyl]-2-pyridylidene]-1,1,1-trifluoro-propan-2-one (known from WO2013/144213), N-(methylsulfonyl)-6-[2-(pyridin-3-yl)-1,3-thiazol-5-yl]pyridine-2-carboxamide (known from WO2012/000896), N-[3-(benzylcarbamoyl)-4-chlorophenyl]-1-methyl-3-(pentafluoroethyl)-4-(trifluoromethyl)-1H-pyrazole-5-carboxamide (known from WO2010/051926).

The biological control agents from the groups (B-1) to (B-6) described below are in particular bacteria, fungi or yeasts, protozoa, viruses, entomopathogenic nematode, inoculants, botanicals and products produced by microorganisms including proteins or secondary metabolites.

(B-1) According to the invention biological control agents which are summarized under the term "bacteria" include spore-forming, root-colonizing bacteria, or bacteria useful as bioinsecticide, biofungicide or bionematocide. Examples of such bacteria to be used or employed according to the invention are:

*Agrobacterium radiobacter, Bacillus acidocaldarius, Bacillus acidoterrestris, Bacillus agri, Bacillus aizawai, Bacillus albolactis, Bacillus alcalophilus, Bacillus alvei, Bacillus aminoglucosidicus, Bacillus aminovorans, Bacillus amylolyticus* (also known as *Paenibacillus amylolyticus*), in particular *Bacillus amyloliquefaciens*, in particular strain IN937a, or strain FZB42 (DSM 231179) (product known as RhizoVital from ABiTEP, DE), or strain B3, *Bacillus aneurinolyticus, Bacillus atrophaeus, Bacillus azotoformans, Bacillus badius,* or *Bacillus cereus* (synonyms: *Bacillus endorhythmos, Bacillus medusa*), in particular spores of *B. cereus* strain CNCM I-1562 (cf. U.S. Pat. No. 6,406,690), *Bacillus* chitinosporus, *Bacillus circulans, Bacillus coagulans, Bacillus endoparasiticus, Bacillus fastidiosus,* or *Bacillus firmus*, in particular strain 1-1582 (products known as Bionem, Flocter or VOTIVO from Bayer CropScience), *Bacillus kurstaki, Bacillus lacticola, Bacillus lactimorbus, Bacillus lactis, Bacillus laterosporus* (also known as *Brevibacillus laterosporus*), *Bacillus lautus, Bacillus lentimorbus, Bacillus lentus, Bacillus licheniformis, Bacillus maroccanus, Bacillus megaterium* (products known as BioArc), *Bacillus metiens, Bacillus mycoides* isolate J, *Bacillus natto, Bacillus nematocida, Bacillus nigrificans, Bacillus nigrum, Bacillus pantothenticus, Bacillus popillae* (products known as Cronox), *Bacillus psychrosaccharolyticus,* or *Bacillus pumilus*, in particular strain GB34 (Accession No. ATCC 700814), (products known as Yield Shield from Bayer Crop Science, DE), and strain QST2808 (Accession No. NRRL B-30087), (products known as Sonata QST 2808 from AgraQuest, US), or *Bacillus siamensis, Bacillus smithii, Bacillus sphaericus* (products known as VectoLexs), *Bacillus subtilis*, in particular strain GB03 (Accession No. ATCC SD-1397), (product known as Kodiak from Bayer Crop Science, DE), and strain QST713/AQ713 (Accession No. NRRL B-21661), (products known as SERENADE® QST 713, SERENADE® Soil and SERENADE® Max from AgraQuest, US), or strain QST30002/AQ30002 (Accesion No. NRRL B-50421, cf. WO 2012/087980), or strain QST30004/AQ30004 (Accession No. NRRL B-50455, cf. WO 2012/087980), or *B. subtilis* var. *amyloliquefaciens* strain FZB24 (products known as Taegro), *Bacillus thuringi-*

*ensis*, in particular *B. thuringiensis* subspecies *israelensis* (serotype H-14), strain AM65-52 (Accession No. ATCC 1276), (product known as VectoBac from Valent BioSciences, US), or *B. thuringiensis* subsp. *aizawai*, in particular strain ABTS-1857 (SD-1372), (products known as XenTari from Bayer Crop Science, DE), or *B. thuringiensis* subsp. *kurstaki* strain HD-1, (product known as Dipel ES from Valent BioSciences, US), or *B. thuringiensis* subsp. *tenebrionis* strain NB 176 (SD-5428), (product known as Novodor FC from BioFa DE), or B. th. var. *aegypti* (products known as Agerin), or B. th. var. *colmeri* (products known as TianBaoBTc), or B. th. var. *darmstadiensis* (products known as Baciturin, Kolepterin), or B. th. var. *dendrolimus* (products known as Dendrobacillin), or B. th. var. *galleriae* ((products known as Enterobactin), or B. th. var. *japonensis* (products known as Buihunter), or B. th. subsp. Morrisoni, or B. th. var. san diego, or B. th. subsp. *thuringiensis* strain MPPL002, or B. th. var. *thuringiensis* (products known as Bikol), or B. th. var 7216 (products known as Amactic, Pethian), or B. th. var T36 (products known as Cahat), or *B. thuringiensis* strain BD#32 (Accession No. NRRL B-21530) from Agraquest, or *B. thuringiensis* strain AQ52 (Accession No. NRRL B-21619) from Agraquest, *Bacillus* uniflagellatus, *Bradyrhizobium japonicum* (Symbiont, products known as Soy Select), *Brevibacillus brevis* (formerly *Bacillus brevis*), in particular strains SS86-3, SS86-4, SS86-5, 2904, *Brevibacillus laterosporus* (formerly *Bacillus laterosporus*), in particular strains 64, 1111, 1645, 1647, Chromobacterium subtsugae, in particular strain PRAA4-1T (products known as Gandevo), Delftia *acidovorans*, in particular strain RAY209 (products known as BioBoost), *Flavobacterium* MBI-302, *Lactobacillus acidophilus* (products known as Fruitsan), Lysobacter *antibioticus*, in particular strain 13-1 (cf. Biological Control 2008, 45, 288-296), Lysobacter enzymogenes, in particular strain C3 (cf. J Nematol. 2006 June; 38(2): 233-239), *Paenibacillus alvei*, in particular strains III3DT-1A, 1112E, 46C3, 2771 (*Bacillus* genetic stock center, November 2001), *Paenibacillus polymyxa, Paenibacillus popilliae* (formerly *Bacillus popilliae*), *Pantoea agglomerans, Pasteuria penetrans* (formerly *Bacillus penetrans*, products known as *Pasteuria* wettable powder from *Pasteuria* Bioscience), *Pasteuria usgae* (products known as Econem™ from *Pasteuria* Bioscience), *Pasteuria nishizawae, Pasteuria* spp. Pr3, *Pectobacterium carotovorum* (formerly *Erwinia carotovora*) products known as BioKeeper, *Pseudomonas aeruginosa* (products known as Guiticid), *Pseudomonas aureofaciens* (products known as Agate-25K), *Pseudomonas cepacia* (formerly known as *Burkholderia cepacia*), in particular strains M54 or J82, *Pseudomonas chlororaphis*, in particular strain MA 342 (products known as Cedomon), *Pseudomonas fluorescens* (products known as Sudozone), *Pseudomonas* proradix (products known as Proradix), *Pseudomonas putida* (products known as Nematsid, *Pseudomonas resinovorans* (products known as Solanacure), *Pseudomonas syringae* (products known as Biosave), *Rhodococcus globerulus* strain AQ719 (Accession No. NRRL B21663) from AgraQuest, US, *Serratia entomophila* (products known as invade), *Serratia marcescens*, in particular strain SRM (MTCC8708) or strain R35, *Streptomyces* sp. strain NRRL B-30145 from Agraquest, *Streptomyces candidus* (products known as BioAid™), *Streptomyces colombiensis* (products known as Mycoside), *Streptomyces galbus* (=*Streptomyces griseoviridis*), in particular strain K61 (Accession No. DSM 7206) (product known as Mycostop from Verdera, cf. Crop Protection 2006, 25, 468-475) or strain QST 6047 (=strain NRRL B-30232) (product known as Virtuoso from Agraquest, US), *Streptomyces microflavus* strain AQ6121 (=QRD 31.013, NRRL B-50550) from Agraquest, US,) *Streptomyces goshikiensis* (products known as Safegro), *Streptomyces griseoviridis* (products known as Mycostop, cf. Microbial db of Canada), *Streptomyces* lavendulae (products known as Phytolavin-300, *Streptomyces lydicus*, in particular strain WYCD108 (products known as ActinovateSP) or strain WYEC108 (products known as Actino-iron), *Streptomyces prasinus* (cf. "Prasinons A and B: potent insecticides from *Streptomyces prasinus*" Applied microbiology 1973 November), *Streptomyces rimosus* (products known as Rhitovit), *Streptomyces* saraceticus (products known as Clanda), *Streptomyces venezuelae, Xanthomonas campestris* (herbicidal activity), Xenorhabdus *luminescens*, and Xenorhabdus nematophila.

(B-2) According to the invention biological control agents that are summarized under the term "fungi" or "yeasts" are:

*Ampelomyces quisqualis*, in particular strain AQ 10 (Accession No. CNCM 1-807) (product known as AQ 10 from IntrachemBio Italia), *Aureobasidium pullulans*, in particular blastospores of strain DSM14940 or blastospores of strain DSM14941 or mixtures thereof, Aschersonia aleyrodes, *Aspergillus flavus*, in particular strain NRRL 21882 (product known as Afla-Guard from Syngenta), Arthrobotrys superba (Corda 1839), *Beauveria bassiana*, in particular strain ATCC 74040 (product known as Naturalis from Intrachem Bio Italia) and strain GHA (products known as Mycotrol, BotaniGard, *Beauveria brongniartii* (products known as Beaupro from Andermatt Biocontrol AG), *Candida oleophila*, in particular strain O (products known as Nexy, Aspire),) *Chaetomium* cupreum (products known as Ketocin), *Cladosporium* cladosporioides, in particular strain H39, Conidiobolus *obscurus, Coniothyrium minitans*, in particular strain CON/M/91-8 (Accession No. DSM-9660), (product known as Contans from Prophyta, DE), *Cryptococcus albidus* (products known as YieldPlus from Anchor Bio-Technologies, ZA), Dilophosphora alopecuri (products known as Twist Fungus), *Entomophthora* virulenta (products known as Vektor), *Fusarium oxysporum*, in particular strain Fo47 (non-pathogenic) (products known as Fusaclean), *Gliocladium catenulatum*, in particular strain J1446 (products known as Prestop or Primastop), Hirsutella thompsonii (products known as Mycohit or ABTEC from Agro Bio-tech Research Centre, *Lagenidium giganteum* (products known as Laginex, AgraQuest), *Lecanicillium* spp., in particular strain HRO LEC 12 from Prophyta, *Lecanicillium lecanii* (formerly known as *Verticillium lecanii*) in particular conidia of strain KV01 (products known as Mycotal or Vertalec, Koppert/Arysta), *Lecanicillium muscarium* (formerly *Verticillium lecanii*), in particular strain 1/1 from Prophyta, *Metarhizium anisopliae*, in particular strain F52 (DSM3884/ATCC 90448) (products known as BIO 1020, BayerCrop Science AG, or Met52, Novozymes), or *M. anisopliae* var *acridum* (products known as GreenGuard or Green Muscle, Becker Underwood, US), or *Metarhizium flavoviride*, Metschnikovia fructicola, in particular the strain NRRL Y-30752 (product known as Shemer from Bayer Crop Science, DE), Microsphaeropsis *ochracea* (products known as Microx from Prophyta, DE), *Mucor hiemalis* (product known as BioAvard), Muscodor *albus*, in particular strain QST 20799 (Accession No. NRRL 30547) (products known as Arabesque™, Glissade™, or Andante™ from Agraquest, US), Muscodor *roseus* strains A3-5 (Accession No. NRRL 30548), *Myrothecium verrucaria*, in particular strain AARC-0255 (products known as DiTera™ from Valent Biosciences), Nomuraea *rileyi*, in particular strains SA86101, GU87401, SR86151, CG128 and VA9101 (products known as Kongo), *Ophiostoma piliferum*, in particular strain D97 (products known as Sylvanex), *Paecilomyces*, *Paecilomyces fumosoroseus* (new: *Isaria fumosorosea*), in particular strain IFPC 200613, or strain apopka 97 (products known as PreFeRal WG from Biobest), *Paecilomyces lilacinus*, in particular spores of *P. lilacinus* strain 251 (AGAL 89/030550), (products known as BioAct from Prophyta, DE; cf. Crop Protection 2008, 27, 352-361, *Paecilomyces variotii*, in particular strain Q-09 (products known as Nemaquim), Pandora delphacis, *Penicillium bilaii*, in particular strain ATCC22348, *Penicillium vermiculatum* (products known as Vermiculen), *Phlebiopsis* (=*Phlebia*=Peniophora) *gigantea* (products known as Rotstop), *Pichia anomala*, in particular strain WRL-076, *Pochonia chlamydosporia*, *Pseudozyma flocculosa*, in particular strain PF-A22 UL, *Pythium oligandrum* DV74, *Talaromyces flavus*, in particular strain V117b (products known as PROTUS WG from Prophyta, DE), *Trichoderma album* (products known as Bio Zeid from Organic Biotechnology, EG), *Trichoderma asperellum*, in particular strain ICC012, *Trichoderma atroviride*, in particular strain SC1 from Agraquest, US, *Trichoderma gamsii* (formerly *T. viride*), in particular strain ICC080 (IMI CC 392151 CABI) (products known as Bioderma), *Trichoderma harmatum*, *Trichoderma harzianum*, in particular *T. harzianum* rifai T39 (products known as Trichodex from Makhteshim, US), or *T. harzianum* rifai strain KRL-AG2 (strain T-22, /ATCC 208479) (products known as PLANTSHIELD T-22G, Rootshield and TurfShield from BioWorks, US), *Trichoderma saturnisporium*, in particular strain PBP-TH-001 from Prophyta, *Trichoderma koningii* (products known as Trikot-S Plus), *Trichoderma lignorum* (products known as Mycobac), *Trichoderma polysporum*, in particular strain IMI 206039, *Trichoderma virens* (also known as *Gliocladium virens*), in particular strain GL-21 (products known as SoilGard from Certis, US), *Tsukamurella paurometabola* (products known as HeberNem), Ulocladium oudemansii (products known as Botry-Zen), *Verticillium albo-atrum*, in particular strain WCS850, *Verticillium chlamydosporium* (products known as Varsha), *Verticillium dahliae* (products known as Dutch Trig), and Zoophtora radicans.

(B-3) According to the invention biological control agents that are summarized under the term "protozoal" are:

*Nosema locustae* (products known as NoloBait), Thelohania solenopsis and Vairimorpha spp.

(B-4) According to the invention biological control agents that are summarized under the term "viruses" are:

*Adoxophyes orana* (summer fruit *tortrix*) granulosis virus (GV), (product known as BIOFA—Capex), *Agrotis segetum* (turnip moth) nuclear polyhedrosis virus (NPV), *Anticarsia gemmatalis* (woolly pyrol moth) mNPV (products known as Polygen), *Autographa californica* (alfalfa looper) mNPV (products known as VPN80 from *Agricola* El Sol), Biston suppressaria (tea looper) NPV, *Bombyx mori* (silkworm) NPV, Cryptophlebia leucotreta (false codling moth) GV (products known as Cryptex), *Cydia pomonella* (codling moth) granulosis virus (GV) (product known as Madex Plus), *Dendrolimus* punctatus (masson pine moth) CPV, *Helicoverpa armigera* NPV (product known as AgBiTech—ViVUS Max), *Helicoverpa* (previously *Heliothis*) *zea* (corn earworm) NPV (products known as Elcar), Leucoma salicis (satin moth) NPV, *Lymantria dispar* (gypsy moth) NPV (products known as Gypcheck), *Neodiprion abietis* (balsamfir sawfly) NPV (products known as Abietiv), *Neodiprion lecontei* (red-headed pinesawfly) NPV (products known as Lecontvirus), *Neodiprion sertifer* (pine sawfly) NPV (products known as Neocheck-S), *Orgyia pseudotsugata* (douglas-fir tussock moth) NPV (products known as Virtuss), *Phthorimaea operculella* (tobacco leaf miner) GV (products known as Matapol), *Pieris rapae* (small white) GV, *Plutella xylostella* (diamondback moth) GV (products known as Plutec), *Spodoptera albula* (gray-streaked armywom moth) mNPV (products known as VPN 82), *Spodoptera exempta* (true armyworm) mNPV (products known as Spodec), *Spodoptera exigua* (sugarbeet armyworm) mNPV (products known as Spexit from Andermatt Biocontrol), *Spodoptera frugiperda* (fall armyworm) mNPV (products known as Baculovirus VPN), *Spodoptera littoralis* (tobacco cutworm) NPV (procucts known as Spodoptrin from NPP Calliope France), and *Spodoptera litura* (oriental leafworm moth) NPV (products known as Littovir).

(B-5) According to the invention biological control agents that are summarized under the term "entomopathogenic nematodes" are:

*Abbreviata caucasica*, *Acuaria* spp., *Agamermis decaudata*, *Allantonema* spp., *Amphimermis* spp., *Beddingia* (=*Deladenus*) *siridicola*, *Bovienema* spp., *Cameronia* spp., *Chitwoodiella ovofilamenta*, *Contortylenchus* spp., *Culicimermis* spp., *Diplotriaena* spp., *Empidomermis* spp., *Filipjevimermis leipsandra*, *Gastromermis* spp., *Gongylonema* spp., *Gynopoecilia pseudovipara*, *Heterorhabditis* spp., in particular *Heterorhabditis bacteriophora* (products known as B-Green or Larvanem, Koppert or Nemasys G, Becker Underwood), or *Heterorhabditis baujardi*, or *Heterorhabditis heliothidis* (products known as Nematon, biohelp GmbH), or *Heterorhabditis indica*, *Heterorhabditis marelatus*, or *Heterorhabditis megidis* (products known as Larvanem M, Koppert or Meginem, Andermatt Biocontrol AG or Nemasys-H), *Heterorhabditis zealandica*, *Hexamermis* spp., *Hydromermis* spp., *Isomermis* spp., *Limnomermis* spp., *Maupasina weissi*, *Mermis nigrescens*, *Mesomermis* spp., *Neomesomermis* spp., *Neoparasitylenchus rugulosi*, *Octomyomermis* spp., *Parasitaphelenchus* spp., *Parasitorhabditis* spp., *Parasitylenchus* spp., *Perutilimermis culicis*, *Phasmarhabditis hermaphrodita*, *Physaloptera* spp., *Protrellatus* spp., *Pterygodermatites* spp., *Romanomermis* spp., *Seuratum cadarachense*, *Sphaerulariopsis* spp., *Spirura guianensis*, *Steinernema* spp. (=*Neoaplectana* spp.), in particular, *Steinernema carpocapsae* (products known as Biocontrol, Nemasys-C, NemAttack), or *Steinernema feltiae* (=*Neoaplectana carpocapsae*), (products known as Nemasys, Nemaflor, Nemaplus, NemaShield), or *Steinernema glaseri* (procucts known as Biotopia), or *Steinernema kraussei* (products known as Larvesure), or *Steinernema riobrave* (products known as Biovector), or *Steinernema scapterisci* (products known as Nematac S), or *Steinernema scarabaei*, or *Steinernema siamkayai*, *Strelkovimermis peterseni*, *Subulura* spp., *Sulphuretylenchus elongatus*, and *Tetrameres* spp.

(B-6) According to the invention biological control agents that are summarized under the term "inoculants" are:

*Agrobacterium* spp., *Azorhizobium caulinodans*, *Azospirillum* spp., *Azotobacter* spp., *Bradyrhizobium* spp., *Burkholderia* spp., in particular *Burkholderia cepacia* (formerly *Pseudomonas cepacia*), *Gigaspora* spp., in particular *Gigaspora margarita*, or *Gigaspora monosporum*, *Glomus* spp., in particular *Glomus aggregatum*, or *Glomus brasilianum*, or *Glomus clarum*, or *Glomus deserticola*, or *Glomus etunicatum*, or *Glomus intraradices*, or *Glomus monosporus*, or *Glomus mosseae*, *Laccaria* spp., in particular *Laccaria bicolor*, or *Laccaria laccata*, *Lactobacillus buchneri*, *Paraglomus* spp., *Pisolithus tinctorus*, *Pseudo¬monas* spp., *Rhizobium* spp., in particular *Rhizobium fredii*, or *Rhizobium*

*leguminosarum*, or *Rhizobium loti*, or *Rhizobium meliloti*, or *Rhizobium trifolii*, or *Rhizobium tropici*, *Rhizopogon amylopogon*, or *Rhizopogon fulvigleba*, or *Rhizopogon luteolus*, or *Rhizopogon tinctorus*, or *Rhizopogon villosullus*, or *Scleroderma* spp., in particular *Scleroderma cepa*, or *Scleroderma citrinum*, *Suillus* spp., in particular *Suillus granulates*, or *Suillus punctatapies* and *Streptomyces* spp.

According to one embodiment of the present invention the biological control agent comprises not only the isolated, pure cultures of the respective microorganisms, but also their suspensions in a whole broth culture or a metabolite-containing supernatant or a purified metabolite obtained from whole broth culture of the strain. "Whole broth culture" refers to a liquid culture containing both cells and media. "Supernatant" refers to the liquid broth remaining when cells grown in broth are removed by centrifugation, filtration, sedimentation, or other means well known in the art.

The above-mentioned metabolites produced by the non-pathogenic microorganisms include antibiotics, enzymes, siderophores and growth promoting agents, for example zwittermicin-A, kanosamine, polyoxine, enzymes such as α-amylase, chitinases, and pektinases, phytohormones and precursors thereof, such as auxines, gibberlin-like substances, cytokinin-like compounds, lipopeptides such as iturins, plipastatins or surfactins, e.g. agrastatin A, bacillomycin D, bacilysin, difficidin, macrolactin, fengycin, bacilysin and bacilaene. Preferred metabolites of the above listed lipopeptides, in particular produce by *Bacillus pumilus* (NRRL Accession No. B-30087), *Bacillus subtilis* AQ713 (NRRL Accession No. B-21661), *Bacillus subtilis* strain AQ30002 (aka QST30002; NRRL Accession No. B-50421), or *Bacillus subtilis* strain AQ30004 (aka QST30004; NRRL Accession No. B-50455).

According to the invention, the biological control agent may be employed or used in any physiologic state such as active or dormant.

Preferred compounds from these groups are as follows:
pyflubumide, acrinathrin, alpha-cypermethrin, beta-cyfluthrin, cyhalothrin, cypermethrin, deltamethrin, etofenprox, lambda-cyhalothrin, gamma-cyhalothrin, zeta-cypermethrin, cyfluthrin, bifenthrin, tefluthrin, imidacloprid, acetamiprid, thiamethoxam, nitenpyram, thiacloprid, dinotefuran, clothianidin, imidaclothiz, methomyl, dimethoate, cartap, aldicarb, carbosulfan, phorate, carbaryl, benfuracarb, ethoprophos, fenamiphos, pyrethrins (pyrethrum), 1-{2-fluoro-4-methyl-5-[(2,2,2-trifluoroethyl) sulfinyl]phenyl}-3-(trifluoromethyl)-1H-1,2,4-triazol-5-amine, afidopyropen, 8-chloro-N-[(2-chloro-5-methoxyphenyl) sulfonyl]-6-(trifluoromethyl) imidazo [1,2-a]pyridine-2-carboxamide, diflubenzuron, lufenuron, triflumuron, novaluron, flufenoxuron, buprofezin, methoxyfenozide, tebufenozide, fipronil, ethiprole, endosulfan, flubendiamide, chlorantraniliprole (Rynaxypyr), cyantraniliprole (Cyazypyr), emamectin, emamectin benzoate, abamectin, milbemectin, lepimectin, tebufenpyrad, fenpyroximate, pyridaben, cyenopyrafen, cyflumetofen, diafenthiuron, spinosad, pyrifluquinazone, pymetrozine, flonicamid, chlorfenapyr, indoxacarb, chlorpyrifos, spirodiclofen, spiromesifen, spirotetramat, spinetoram, acephate, profenofos, flupyradifurone, thiodicarb, sulfoxaflor, fluensulfone, fluopyram, carbofuran, oxamyl, cadusafos, fosthiazate, imicyafos, flubendiamide, iprodione, tioxazafen, triflumezopyrim, dimethyl-disulfide, N-(methylsulfonyl)-6-[2-(pyridin-3-yl)-1,3-thiazol-5-yl]pyridine-2-carboxamide, 1-(3-chloropyridin-2-yl)-N-[4-cyano-2-methyl-6-(methylcarba-moyl)phenyl]-3-{[5-(trifluoromethyl)-2H-tetrazol-2-yl]methyl}-1H-pyrazole-5-carboxamide, azadirachtin, thymol.

Preferred compounds from these groups are additionally the following:

*Metschnikowia fructicola*, *Bacillus firmus*, in particular strain 1-1582 (products known as Bionem or VOTIVO from Bayer CropScience), *Bacillus subtilis*, *Paecilomyces lilacinus*, in particular spores of *P. lilacinus* strain 251 (AGAL 89/030550), (products known as BioAct from Prophyta, DE), *Metarhizium anisopliae* var *acridum* (products known as GreenGuard, Becker Underwood, US), *Cydia pomonella* (Codling moth) granulosis virus (GV) (product known as Madex Plus from Andermatt Biocontrol, CH, *Bacillus thuringiensis*, *Bacillus amyloliquefaciens*, *Streptomyces microflavus* strain AQ6121 (=QRD 31.013, NRRL B-50550) from Agraquest, US, *Pasteuria penetrans*, *Pasteuria nishizawae*, *Pasteuria usgae* (products known as Econem™ from *Pasteuria* Bioscience), *Pasteuria* spp. Pr3, *Myrothecium verrucaria*, SERENADE® soil/DPZ™ (*Bacillus subtilis* strain QST713), *Flavobacterium* MBI-302

Especially preferred active ingredient combinations are those in which a compound of the formula (I) is combined with the compounds/biological control agent 1 to 38 indicated in Table A and Table B. The preferred and particularly preferred mixing ratios indicated in the table are weight ratios. The ratio should be understood in each case as compound of the formula (I) to mixing partner 1 to 38.

TABLE A

| No. | Mixing partner | Preferred mixing ratio | Particularly preferred mixing ratio |
|---|---|---|---|
| 1. | Imidacloprid | 3:1 to 1:7 | 1:0.21 to 1:2.25 |
| 2. | Clothianidin | 3:1 to 1:4 | 1:0.25 to 1:1.4 |
| 3. | Thiacloprid | 3:1 to 1:1 | 1:0.1 to 1:0.44 |
| 4. | Sulfoxaflor | 3:1 to 1:1 | 1:0.02 to 1:0.38 |
| 5. | Flupyradifurone 4-{[(6-chloropyrid-3-yl)methyl](2,2-difluoroethyl)amino}furan-2(5H)-one | 3:1 to 1:12 | 1:0.2 to 1:4 |
| 6. | Carbofuran | 3:2 to 1:80 | 1:2.25 to 1:26.89 |
| 7. | Thiodicarb | 3:1 to 1:10 | 1:1.12 to 1:3.36 |
| 8. | Oxamyl | 3:1 to 1:54 | 1:1.12 to 1:17.92 |
| 9. | Cadusafos | 3:4 to 1:60 | 1:4 to 1:20 |
| 10. | Fosthiazate | 3:3 to 1:36 | 1:3 to 1:12 |
| 11. | Imicyafos | 3:6 to 1:36 | 1:6 to 1:12 |
| 12. | Tefluthrin | 3:1 to 1:2 | 1:0.23 to 1:0.6 |
| 13. | Chlorantraniliprole (FCH 1557) | 3:1 to 1:1 | 1:0.06 to 1:0.44 |

TABLE A-continued

| No. | Mixing partner | Preferred mixing ratio | Particularly preferred mixing ratio |
|---|---|---|---|
| 14. | Cyantraniliprole (FCH 1706) | 3:1 to 1:1 | 1:0.06 to 1:0.44 |
| 15. | Flubendiamide | 3:1 to 1:1 | 1:0.06 to 1:0.44 |
| 16. | 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | 3:1 to 1:2 | 1:0.05 to 1:0.6 |
| 17. | Fipronil | 3:1 to 1:2 | 1:0.1 to 1:0.6 |
| 18. | Ethiprole | 3:1 to 1:5 | 1:0.05 to 1:1.6 |
| 19. | Abamectin | 3:1 to 1:1 | 1:0.03 to 1:0.07 |
| 20. | Emamectin-benzoate | 3:1 to 1:1 | 1:0.02 to 1:0.04 |
| 21. | Fluensulfone | 3:4 to 1:48 | 1:4 to 1:16 |
| 22. | Dimethyl-disulfide | 3:694 to 1:5460 | 1:694 to 1:1820 |
| 23. | 1-{2-fluoro-4-methyl-5-[(2,2,2-trifluoroethyl)sulfinyl]phenyl}-3-(trifluoromethyl)-1H-1,2,4-triazol-5-amine | 3:1 to 1:2 | 1:0.2 to 1:0.6 |
| 24. | Triflumezopyrim | 3:1 to 1:24 | 1:0.002 to 1:8 |
| 25. | Iprodione | 3:2 to 1:72 | 1:2 to 1:24 |
| 26. | Fluopyram | 3:1 to 1:12 | 1:0.2 to 1:4 |
| 27. | 8-chloro-N-[(2-chloro-5-methoxyphenyl)sulfonyl]-6-(trifluoromethyl)imidazo[1,2-a]pyridine-2-carboxamide | 3:1 to 1:96 | 1:0.0002 to 1:32 |
| 28. | Tioxazafen | 3:1 to 1:96 | 1:0.0002 to 1:32 |
| 29. | *Pasteuria penetrans* | 3:1 to 1:1 | 1:0.04 to 1:0.39 |
| 30. | *Pasteuria nishizawae* | 3:1 to 1:1 | 1:0.04 to 1:0.39 |
| 31. | *Pasteuria usgae* | 3:1 to 1:1 | 1:0.04 to 1:0.39 |
| 32. | *Pasteuria* spp. Pr3 | 3:1 to 1:1 | 1:0.04 to 1:0.39 |
| 33. | *Myrothecium verrucaria* | 3:28 to 1:1267 | 1:27.51 to 1:422.37 |
| 34. | *Flavobacterium* MBI-302 | 3:1 to 1:1 | 1:0.04 to 1:0.39 |
| 35. | SERENADE ®soil/DPZ ™ (*Bacillus subtilis* strain QST713) | 3:1 to 1:2 | 1:0.125 to 1:0.752 |
| 36. | *Paecilomyces lilacinus* | 3:1 to 1:2 | 1:0.32 to 1:0.64 |
| 37. | *Bacillus firmus* I-1582 | 3:160 to 1:960 | 1:160 to 1:320 |
| 38. | Azadirachtin | 3:1 to 1:1 | 1:0.5 to 1:0.2 |

Especially preferred active ingredient combinations are those shown in Table Aa. The preferred and particularly preferred mixing ratios indicated in the table are weight ratios. The ratio should be understood in each case as compound of the formula (Ia) to mixing partner 1 to 38.

TABLE Aa

| No. | Combination | Preferred mixing ratio | Particularly preferred mixing ratio |
|---|---|---|---|
| 1. | (Ia) + Imidacloprid | 3:1 to 1:7 | 1:0.21 to 1:2.25 |
| 2. | (Ia) + Clothianidin | 3:1 to 1:4 | 1:0.25 to 1:1.4 |
| 3. | (Ia) + Thiacloprid | 3:1 to 1:1 | 1:0.1 to 1:0.44 |
| 4. | (Ia) + Sulfoxaflor | 3:1 to 1:1 | 1:0.02 to 1:0.38 |
| 5. | (Ia) + Flupyradifurone 4-{[(6-chloropyrid-3-yl)methyl](2,2-difluoroethyl)amino}furan-2(5H)-one | 3:1 to 1:12 | 1:0.2 to 1:4 |
| 6. | (Ia) + Carbofuran | 3:2 to 1:80 | 1:2.25 to 1:26.89 |
| 7. | (Ia) + Thiodicarb | 3:1 to 1:10 | 1:1.12 to 1:3.36 |
| 8. | (Ia) + Oxamyl | 3:1 to 1:54 | 1:1.12 to 1:17.92 |
| 9. | (Ia) + Cadusafos | 3:4 to 1:60 | 1:4 to 1:20 |
| 10. | (Ia) + Fosthiazate | 3:3 to 1:36 | 1:3 to 1:12 |
| 11. | (Ia) + Imicyafos | 3:6 to 1:36 | 1:6 to 1:12 |
| 12. | (Ia) + Tefluthrin | 3:1 to 1:2 | 1:0.23 to 1:0.6 |
| 13. | (Ia) + Chlorantraniliprole (FCH 1557) | 3:1 to 1:1 | 1:0.06 to 1:0.44 |
| 14. | (Ia) + Cyantraniliprole (FCH 1706) | 3:1 to 1:1 | 1:0.06 to 1:0.44 |
| 15. | (Ia) + Flubendiamide | 3:1 to 1:1 | 1:0.06 to 1:0.44 |
| 16. | (Ia) + 1-(3-chloropyridin-2-yl)-N-[4-cyano-2-methyl-6-(methylcarbamoyl)phenyl]-3- | 3:1 to 1:2 | 1:0.05 to 1:0.6 |

TABLE Aa-continued

| No. | Combination | Preferred mixing ratio | Particularly preferred mixing ratio |
|---|---|---|---|
| | {[5-(trifluoromethyl)-2H-tetrazol-2-yl]methyl}-1H-pyrazole-5-carboxamide | | |
| 17. | (Ia) + Fipronil | 3:1 to 1:2 | 1:0.1 to 1:0.6 |
| 18. | (Ia) + Ethiprole | 3:1 to 1:5 | 1:0.05 to 1:1.6 |
| 19. | (Ia) + Abamectin | 3:1 to 1:1 | 1:0.03 to 1:0.07 |
| 20. | (Ia) + Emamectin-benzoate | 3:1 to 1:1 | 1:0.02 to 1:0.04 |
| 21. | (Ia) + Fluensulfone | 3:4 to 1:48 | 1:4 to 1:16 |
| 22. | (Ia) + Dimethyl-disulfide | 3:694 to 1:5460 | 1:694 to 1:1820 |
| 23. | (Ia) + 1-{2-fluoro-4-methyl-5-[(2,2,2-trifluoroethyl)sulfinyl]phenyl}-3-(trifluoromethyl)-1H-1,2,4-triazol-5-amine | 3:1 to 1:2 | 1:0.2 to 1:0.6 |
| 24. | (Ia) + Triflumezopyrim | 3:1 to 1:24 | 1:0.002 to 1:8 |
| 25. | (Ia) + Iprodione | 3:2 to 1:72 | 1:2 to 1:24 |
| 26. | (Ia) + Fluopyram | 3:1 to 1:12 | 1:0.2 to 1:4 |
| 27. | (Ia) + 8-chloro-N-[(2-chloro-5-methoxyphenyl)sulfonyl]-6-(trifluoromethyl)imidazo[1,2-a]pyridine-2-carboxamide | 3:1 to 1:96 | 1:0.0002 to 1:32 |
| 28. | (Ia) + Tioxazafen | 3:1 to 1:96 | 1:0.0002 to 1:32 |
| 29. | (Ia) + *Pasteuria penetrans* | 3:1 to 1:1 | 1:0.04 to 1:0.39 |
| 30. | (Ia) + *Pasteuria nishizawae* | 3:1 to 1:1 | 1:0.04 to 1:0.39 |
| 31. | (Ia) + *Pasteuria usgae* | 3:1 to 1:1 | 1:0.04 to 1:0.39 |
| 32. | (Ia) + *Pasteuria* spp. Pr3 | 3:1 to 1:1 | 1:0.04 to 1:0.39 |
| 33. | (Ia) + *Myrothecium verrucaria* | 3:28 to 1:1267 | 1:27.51 to 1:422.37 |
| 34. | (Ia) + *Flavobacterium* MBI-302 | 3:1 to 1:1 | 1:0.04 to 1:0.39 |
| 35. | (Ia) + SERENADE ® soil/DPZ ™ (*Bacillus subtilis* strain QST713) | 3:1 to 1:2 | 1:0.125 to 1:0.752 |
| 36. | (Ia) + *Paecilomyces lilacinus* | 3:1 to 1:2 | 1:0.32 to 1:0.64 |
| 37. | (Ia) + *Bacillus firmus* I-1582 | 3:160 to 1:960 | 1:160 to 1:320 |
| 38. | (Ia) + Azadirachtin | 3:1 to 1:1 | 1:0.5 to 1:0.2 |

Further especially preferred active ingredient combinations are those shown in Table Ab. The preferred and particularly preferred mixing ratios indicated in the table are weight ratios. The ratio should be understood in each case as compound of the formula (Ib) to mixing partner 1 to 38.

TABLE Ab

| No. | Combination | Preferred mixing ratio | Particularly preferred mixing ratio |
|---|---|---|---|
| 1. | (Ib) + Imidacloprid | 3:1 to 1:7 | 1:0.21 to 1:2.25 |
| 2. | (Ib) + Clothianidin | 3:1 to 1:4 | 1:0.25 to 1:1.4 |
| 3. | (Ib) + Thiacloprid | 3:1 to 1:1 | 1:0.1 to 1:0.44 |
| 4. | (Ib) + Sulfoxaflor | 3:1 to 1:1 | 1:0.02 to 1:0.38 |
| 5. | (Ib) + Flupyradifurone 4-{[(6-chloropyrid-3-yl)methyl](2,2-difluoroethyl)amino}furan-2(5H)-one | 3:1 to 1:12 | 1:0.2 to 1:4 |
| 6. | (Ib) + Carbofuran | 3:2 to 1:80 | 1:2.25 to 1:26.89 |
| 7. | (Ib) + Thiodicarb | 3:1 to 1:10 | 1:1.12 to 1:3.36 |
| 8. | (Ib) + Oxamyl | 3:1 to 1:54 | 1:1.12 to 1:17.92 |
| 9. | (Ib) + Cadusafos | 3:4 to 1:60 | 1:4 to 1:20 |
| 10. | (Ib) + Fosthiazate | 3:3 to 1:36 | 1:3 to 1:12 |
| 11. | (Ib) + Imicyafos | 3:6 to 1:36 | 1:6 to 1:12 |
| 12. | (Ib) + Tefluthrin | 3:1 to 1:2 | 1:0.23 to 1:0.6 |
| 13. | (Ib) + Chlorantraniliprole (FCH 1557) | 3:1 to 1:1 | 1:0.06 to 1:0.44 |
| 14. | (Ib) + Cyantraniliprole (FCH 1706) | 3:1 to 1:1 | 1:0.06 to 1:0.44 |
| 15. | (Ib) + Flubendiamide | 3:1 to 1:1 | 1:0.06 to 1:0.44 |
| 16. | (Ib) + 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | 3:1 to 1:2 | 1:0.05 to 1:0.6 |
| 17. | (Ib) + Fipronil | 3:1 to 1:2 | 1:0.1 to 1:0.6 |
| 18. | (Ib) + Ethiprole | 3:1 to 1:5 | 1:0.05 to 1:1.6 |
| 19. | (Ib) + Abamectin | 3:1 to 1:1 | 1:0.03 to 1:0.07 |

TABLE Ab-continued

| No. | Combination | Preferred mixing ratio | Particularly preferred mixing ratio |
|---|---|---|---|
| 20. | (Ib) + Emamectin-benzoate | 3:1 to 1:1 | 1:0.02 to 1:0.04 |
| 21. | (Ib) + Fluensulfone | 3:4 to 1:48 | 1:4 to 1:16 |
| 22. | (Ib) + Dimethyl-disulfide | 3:694 to 1:5460 | 1:694 to 1:1820 |
| 23. | (Ib) + 1-{2-fluoro-4-methyl-5-[(2,2,2-trifluoroethyl)sulfinyl]phenyl}-3-(trifluoromethyl)-1H-1,2,4-triazol-5-amine | 3:1 to 1:2 | 1:0.2 to 1:0.6 |
| 24. | (Ib) + Triflumezopyrim | 3:1 to 1:24 | 1:0.002 to 1:8 |
| 25. | (Ib) + Iprodione | 3:2 to 1:72 | 1:2 to 1:24 |
| 26. | (Ib) + Fluopyram | 3:1 to 1:12 | 1:0.2 to 1:4 |
| 27. | (Ib) + 8-chloro-N-[(2-chloro-5-methoxyphenyl)sulfonyl]-6-(trifluoromethyl)imidazo[1,2-a]pyridine-2-carboxamide | 3:1 to 1:96 | 1:0.0002 to 1:32 |
| 28. | (Ib) + Tioxazafen | 3:1 to 1:96 | 1:0.0002 to 1:32 |
| 29. | (Ib) + *Pasteuria penetrans* | 3:1 to 1:1 | 1:0.04 to 1:0.39 |
| 30. | (Ib) + *Pasteuria nishizawae* | 3:1 to 1:1 | 1:0.04 to 1:0.39 |
| 31. | (Ib) + *Pasteuria usgae* | 3:1 to 1:1 | 1:0.04 to 1:0.39 |
| 32. | (Ib) + *Pasteuria* spp. Pr3 | 3:1 to 1:1 | 1:0.04 to 1:0.39 |
| 33. | (Ib) + *Myrothecium verrucaria* | 3:28 to 1:1267 | 1:27.51 to 1:422.37 |
| 34. | (Ib) + *Flavobacterium* MBI-302 | 3:1 to 1:1 | 1:0.04 to 1:0.39 |
| 35. | (Ib) + SERENADE ® soil/ DPZ ™ (*Bacillus subtilis* strain QST713) | 3:1 to 1:2 | 1:0.125 to 1:0.752 |
| 36. | (Ib) + *Paecilomyces lilacinus* | 3:1 to 1:2 | 1:0.32 to 1:0.64 |
| 37. | (Ib) + *Bacillus firmus* I-1582 | 3:160 to 1:960 | 1:160 to 1:320 |
| 38. | (Ib) + Azadirachtin | 3:1 to 1:1 | 1:0.5 to 1:0.2 |

Further especially preferred active ingredient combinations are those shown in Table Ac. The preferred and particularly preferred mixing ratios indicated in the table are weight ratios. The ratio should be understood in each case as compound of the formula (Ic) to mixing partner 1 to 38.

TABLE Ac

| No. | Combination | Preferred mixing ratio | Particularly preferred mixing ratio |
|---|---|---|---|
| 1. | (Ic) + Imidacloprid | 3:1 to 1:7 | 1:0.21 to 1:2.25 |
| 2. | (Ic) + Clothianidin | 3:1 to 1:4 | 1:0.25 to 1:1.4 |
| 3. | (Ic) + Thiacloprid | 3:1 to 1:1 | 1:0.1 to 1:0.44 |
| 4. | (Ic) + Sulfoxaflor | 3:1 to 1:1 | 1:0.02 to 1:0.38 |
| 5. | (Ic) + Flupyradifurone 4-{[(6-chloropyrid-3-yl)methyl](2,2-difluoroethyl)amino}furan-2(5H)-one | 3:1 to 1:12 | 1:0.2 to 1:4 |
| 6. | (Ic) + Carbofuran | 3:2 to 1:80 | 1:2.25 to 1:26.89 |
| 7. | (Ic) + Thiodicarb | 3:1 to 1:10 | 1:1.12 to 1:3.36 |
| 8. | (Ic) + Oxamyl | 3:1 to 1:54 | 1:1.12 to 1:17.92 |
| 9. | (Ic) + Cadusafos | 3:4 to 1:60 | 1:4 to 1:20 |
| 10. | (Ic) + Fosthiazate | 3:3 to 1:36 | 1:3 to 1:12 |
| 11. | (Ic) + Imicyafos | 3:6 to 1:36 | 1:6 to 1:12 |
| 12. | (Ic) + Tefluthrin | 3:1 to 1:2 | 1:0.23 to 1:0.6 |
| 13. | (Ic) + Chlorantraniliprole (FCH 1557) | 3:1 to 1:1 | 1:0.06 to 1:0.44 |
| 14. | (Ic) + Cyantraniliprole (FCH 1706) | 3:1 to 1:1 | 1:0.06 to 1:0.44 |
| 15. | (Ic) + Flubendiamide | 3:1 to 1:1 | 1:0.06 to 1:0.44 |
| 16. | (Ic) + 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | 3:1 to 1:2 | 1:0.05 to 1:0.6 |
| 17. | (Ic) + Fipronil | 3:1 to 1:2 | 1:0.1 to 1:0.6 |
| 18. | (Ic) + Ethiprole | 3:1 to 1:5 | 1:0.05 to 1:1.6 |
| 19. | (Ic) + Abamectin | 3:1 to 1:1 | 1:0.03 to 1:0.07 |
| 20. | (Ic) + Emamectin-benzoate | 3:1 to 1:1 | 1:0.02 to 1:0.04 |
| 21. | (Ic) + Fluensulfone | 3:4 to 1:48 | 1:4 to 1:16 |
| 22. | (Ic) + Dimethyl-disulfide | 3:694 to 1:5460 | 1:694 to 1:1820 |
| 23. | (Ic) + 1-{2-fluoro-4-methyl-5-[(2,2,2- | 3:1 to 1:2 | 1:0.2 to 1:0.6 |

TABLE Ac-continued

| No. | Combination | Preferred mixing ratio | Particularly preferred mixing ratio |
|---|---|---|---|
| | trifluoroethyl)sulfinyl]phenyl}-3-(trifluoromethyl)-1H-1,2,4-triazol-5-amine | | |
| 24. | (Ic) + Triflumezopyrim | 3:1 to 1:24 | 1:0.002 to 1:8 |
| 25. | (Ic) + Iprodione | 3:2 to 1:72 | 1:2 to 1:24 |
| 26. | (Ic) + Fluopyram | 3:1 to 1:12 | 1:0.2 to 1:4 |
| 27. | (Ic) + 8-chloro-N-[(2-chloro-5-methoxyphenyl)sulfonyl]-6-(trifluoromethyl)imidazo[1,2-a]pyridine-2-carboxamide | 3:1 to 1:96 | 1:0.0002 to 1:32 |
| 28. | (Ic) + Tioxazafen | 3:1 to 1:96 | 1:0.0002 to 1:32 |
| 29. | (Ic) + *Pasteuria penetrans* | 3:1 to 1:1 | 1:0.04 to 1:0.39 |
| 30. | (Ic) + *Pasteuria nishizawae* | 3:1 to 1:1 | 1:0.04 to 1:0.39 |
| 31. | (Ic) + *Pasteuria usgae* | 3:1 to 1:1 | 1:0.04 to 1:0.39 |
| 32. | (Ic) + *Pasteuria* spp. Pr3 | 3:1 to 1:1 | 1:0.04 to 1:0.39 |
| 33. | (Ic) + *Myrothecium verrucaria* | 3:28 to 1:1267 | 1:27.51 to 1:422.37 |
| 34. | (Ic) + *Flavobacterium* MBI-302 | 3:1 to 1:1 | 1:0.04 to 1:0.39 |
| 35. | (Ic) + SERENADE ® soil/DPZ ™ (*Bacillus subtilis* strain QST713) | 3:1 to 1:2 | 1:0.125 to 1:0.752 |
| 36. | (Ic) + *Paecilomyces lilacinus* | 3:1 to 1:2 | 1:0.32 to 1:0.64 |
| 37. | (Ic) + *Bacillus firmus* I-1582 | 3:160 to 1:960 | 1:160 to 1:320 |
| 38. | (Ic) + Azadirachtin | 3:1 to 1:1 | 1:0.5 to 1:0.2 |

TABLE B

| No. | Mixing partner | Preferred mixing ratio | Particularly preferred mixing ratio |
|---|---|---|---|
| 1. | Imidacloprid | 20:1 to 1:5 | 5:1 to 1:2.5 |
| 2. | Clothianidin | 100:1 to 1:5 | 4:1 to 1:2 |
| 3. | Thiacloprid | 15:1 to 1:1 | 10:1 to 2:1 |
| 4. | Sulfoxaflor | 75:1 to 1:1 | 50:1 to 2.5:1 |
| 5. | Flupyradifurone 4-{[(6-chloropyrid-3-yl)methyl](2,2-difluoroethyl)amino}furan-2(5H)-one | 10:1 to 1:10 | 5:1 to 1:4 |
| 6. | Carbofuran | 1:1 to 1:50 | 1:2 to 1:30 |
| 7. | Thiodicarb | 5:1 to 1:10 | 1:1 to 1:4 |
| 8. | Oxamyl | 5:1 to 1:25 | 1:1 to 1:20 |
| 9. | Cadusafos | 1:1 to 1:25 | 1:4 to 1:20 |
| 10. | Fosthiazate | 1:1 to 1:20 | 1:3 to 1:12 |
| 11. | Imicyafos | 1:1 to 1:20 | 1:6 to 1:12 |
| 12. | Tefluthrin | 10:1 to 1:1 | 5:1 to 2:1 |
| 13. | Chlorantraniliprole (FCH 1557) | 25:1 to 1:1 | 17:1 to 2:1 |
| 14. | Cyantraniliprole (FCH 1706) | 25:1 to 1:1 | 17:1 to 2:1 |
| 15. | Flubendiamide | 25:1 to 1:1 | 17:1 to 2:1 |
| 16. | 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | 25:1 to 1:1 | 20:1 to 2:1 |
| 17. | Fipronil | 15:1 to 1:1 | 10:1 to 2:1 |
| 18. | Ethiprole | 25:1 to 1:5 | 20:1 to 1:2 |
| 19. | Abamectin | 50:1 to 5:1 | 35:1 to 10:1 |
| 20. | Emamectin-benzoate | 75:1 to 10:1 | 50:1 to 25:1 |
| 21. | Fluensulfone | 1:1 to 1:20 | 1:4 to 1:16 |
| 22. | Dimethyl-disulfide | 1:500 to 1:2000 | 1:694 to 1:1820 |
| 23. | 1-{2-fluoro-4-methyl-5-[(2,2,2-trifluoroethyl)sulfinyl]phenyl}-3-(trifluoromethyl)-1H-1,2,4-triazol-5-amine | 10:1 to 1:1 | 5:1 to 2:1 |
| 24. | Triflumezopyrim | 750:1 to 1:15 | 500:1 to 1:8 |
| 25. | Iprodione | 1:1 to 1:30 | 1:2 to 1:24 |
| 26. | Fluopyram | 10:1 to 1:10 | 5:1 to 1:4 |
| 27. | 8-chloro-N-[(2-chloro-5-methoxyphenyl)sulfonyl]-6-(trifluoromethyl)imidazo[1,2-a]pyridine-2-carboxamide | 7500:1 to 1:50 | 5000:1 to 1:32 |

TABLE B-continued

| No. | Mixing partner | Preferred mixing ratio | Particularly preferred mixing ratio |
|---|---|---|---|
| 28. | Tioxazafen | 7500:1 to 1:50 | 5000:1 to 1:32 |
| 29. | *Pasteuria penetrans* | 30:1 to 1:1 | 25:1 to 2.5:1 |
| 30. | *Pasteuria nishizawae* | 30:1 to 1:1 | 25:1 to 2.5:1 |
| 31. | *Pasteuria usgae* | 30:1 to 1:1 | 25:1 to 2.5:1 |
| 32. | *Pasteuria* spp. Pr3 | 30:1 to 1:1 | 25:1 to 2.5:1 |
| 33. | *Myrothecium verrucaria* | 1:20 to 1:500 | 1:28 to 1:423 |
| 34. | *Flavobacterium* MBI-302 | 30:1 to 1:1 | 25:1 to 2.5:1 |
| 35. | SERENADE ® soil/DPZ ™ (*Bacillus subtilis* strain QST713) | 15:1 to 1:20 | 8:1 to 1.5:1 |
| 36. | *Paecilomyces lilacinus* | 5:1 to 1:1 | 3.5:1 to 2:1 |
| 37. | *Bacillus firmus* I-1582 | 1:100 to 1:500 | 1:160 to 1:320 |
| 38. | Azadirachtin | 10:1 to 1:20 | 5:1 to 2:1 |

Further especially preferred active ingredient combinations are those shown in Table Ba. The preferred and particularly preferred mixing ratios indicated in the table are weight ratios. The ratio should be understood in each case as compound of the formula (Ia) to mixing partner 1 to 38.

TABLE Ba

| No. | Combination | Preferred mixing ratio | Particularly preferred mixing ratio |
|---|---|---|---|
| 1. | (Ia) + Imidacloprid | 20:1 to 1:5 | 5:1 to 1:2.5 |
| 2. | (Ia) + Clothianidin | 100:1 to 1:5 | 4:1 to 1:2 |
| 3. | (Ia) + Thiacloprid | 15:1 to 1:1 | 10:1 to 2:1 |
| 4. | (Ia) + Sulfoxaflor | 75:1 to 1:1 | 50:1 to 2.5:1 |
| 5. | (Ia) + Flupyradifurone 4-{[(6-chloropyrid-3-yl)methyl](2,2-difluoroethyl)amino}furan-2(5H)-one | 10:1 to 1:10 | 5:1 to 1:4 |
| 6. | (Ia) + Carbofuran | 1:1 to 1:50 | 1:2 to 1:30 |
| 7. | (Ia) + Thiodicarb | 5:1 to 1:10 | 1:1 to 1:4 |
| 8. | (Ia) + Oxamyl | 5:1 to 1:25 | 1:1 to 1:20 |
| 9. | (Ia) + Cadusafos | 1:1 to 1:25 | 1:4 to 1:20 |
| 10. | (Ia) + Fosthiazate | 1:1 to 1:20 | 1:3 to 1:12 |
| 11. | (Ia) + Imicyafos | 1:1 to 1:20 | 1:6 to 1:12 |
| 12. | (Ia) + Tefluthrin | 10:1 to 1:1 | 5:1 to 2:1 |
| 13. | (Ia) + Chlorantraniliprole (FCH 1557) | 25:1 to 1:1 | 17:1 to 2:1 |
| 14. | (Ia) + Cyantraniliprole (FCH 1706) | 25:1 to 1:1 | 17:1 to 2:1 |
| 15. | (Ia) + Flubendiamide | 25:1 to 1:1 | 17:1 to 2:1 |
| 16. | (Ia) + 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | 25:1 to 1:1 | 20:1 to 2:1 |
| 17. | (Ia) + Fipronil | 15:1 to 1:1 | 10:1 to 2:1 |
| 18. | (Ia) + Ethiprole | 25:1 to 1:5 | 20:1 to 1:2 |
| 19. | (Ia) + Abamectin | 50:1 to 5:1 | 35:1 to 10:1 |
| 20. | (Ia) + Emamectin-benzoate | 75:1 to 10:1 | 50:1 to 25:1 |
| 21. | (Ia) + Fluensulfone | 1:1 to 1:20 | 1:4 to 1:16 |
| 22. | (Ia) + Dimethyl-disulfide | 1:500 to 1:2000 | 1:694 to 1:1820 |
| 23. | (Ia) + 1-{2-fluoro-4-methyl-5-[(2,2,2-trifluoroethyl)sulfinyl]phenyl}-3-(trifluoromethyl)-1H-1,2,4-triazol-5-amine | 10:1 to 1:1 | 5:1 to 2:1 |
| 24. | (Ia) + Triflumezopyrim | 750:1 to 1:15 | 500:1 to 1:8 |
| 25. | (Ia) + Iprodione | 1:1 to 1:30 | 1:2 to 1:24 |
| 26. | (Ia) + Fluopyram | 10:1 to 1:10 | 5:1 to 1:4 |
| 27. | (Ia) + 8-chloro-N-[(2-chloro-5-methoxyphenyl)sulfonyl]-6-(trifluoromethyl)imidazo[1,2-a]pyridine-2-carboxamide | 7500:1 to 1:50 | 5000:1 to 1:32 |
| 28. | (Ia) + Tioxazafen | 7500:1 to 1:50 | 5000:1 to 1:32 |
| 29. | (Ia) + *Pasteuria penetrans* | 30:1 to 1:1 | 25:1 to 2.5:1 |
| 30. | (Ia) + *Pasteuria nishizawae* | 30:1 to 1:1 | 25:1 to 2.5:1 |
| 31. | (Ia) + *Pasteuria usgae* | 30:1 to 1:1 | 25:1 to 2.5:1 |
| 32. | (Ia) + *Pasteuria* spp. Pr3 | 30:1 to 1:1 | 25:1 to 2.5:1 |
| 33. | (Ia) + *Myrothecium verrucaria* | 1:20 to 1:500 | 1:28 to 1:423 |
| 34. | (Ia) + *Flavobacterium* MBI-302 | 30:1 to 1:1 | 25:1 to 2.5:1 |
| 35. | (Ia) + SERENADE ® soil/DPZ ™ (*Bacillus subtilis* strain QST713) | 15:1 to 1:20 | 8:1 to 1.5:1 |
| 36. | (Ia) + *Paecilomyces lilacinus* | 5:1 to 1:1 | 3.5:1 to 2:1 |
| 37. | (Ia) + *Bacillus firmus* I-1582 | 1:100 to 1:500 | 1:160 to 1:320 |
| 38. | (Ia) + Azadirachtin | 10:1 to 1:20 | 5:1 to 2:1 |

Further especially preferred active ingredient combinations are those shown in Table Bb. The preferred and particularly preferred mixing ratios indicated in the table are weight ratios. The ratio should be understood in each case as compound of the formula (Ib) to mixing partner 1 to 38.

TABLE Bb

| No. | Combination | Preferred mixing ratio | Particularly preferred mixing ratio |
|---|---|---|---|
| 1. | (Ib) + Imidacloprid | 20:1 to 1:5 | 5:1 to 1:2.5 |
| 2. | (Ib) + Clothianidin | 100:1 to 1:5 | 4:1 to 1:2 |
| 3. | (Ib) + Thiacloprid | 15:1 to 1:1 | 10:1 to 2:1 |
| 4. | (Ib) + Sulfoxaflor | 75:1 to 1:1 | 50:1 to 2.5:1 |
| 5. | (Ib) + Flupyradifurone 4-{[(6-chloropyrid-3-yl)methyl](2,2-difluoroethyl)amino}furan-2(5H)-one | 10:1 to 1:10 | 5:1 to 1:4 |
| 6. | (Ib) + Carbofuran | 1:1 to 1:50 | 1:2 to 1:30 |
| 7. | (Ib) + Thiodicarb | 5:1 to 1:10 | 1:1 to 1:4 |
| 8. | (Ib) + Oxamyl | 5:1 to 1:25 | 1:1 to 1:20 |
| 9. | (Ib) + Cadusafos | 1:1 to 1:25 | 1:4 to 1:20 |
| 10. | (Ib) + Fosthiazate | 1:1 to 1:20 | 1:3 to 1:12 |
| 11. | (Ib) + Imicyafos | 1:1 to 1:20 | 1:6 to 1:12 |
| 12. | (Ib) + Tefluthrin | 10:1 to 1:1 | 5:1 to 2:1 |
| 13. | (Ib) + Chlorantraniliprole (FCH 1557) | 25:1 to 1:1 | 17:1 to 2:1 |
| 14. | (Ib) + Cyantraniliprole (FCH 1706) | 25:1 to 1:1 | 17:1 to 2:1 |
| 15. | (Ib) + Flubendiamide | 25:1 to 1:1 | 17:1 to 2:1 |
| 16. | (Ib) + 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | 25:1 to 1:1 | 20:1 to 2:1 |
| 17. | (Ib) + Fipronil | 15:1 to 1:1 | 10:1 to 2:1 |

TABLE Bb-continued

| No. | Combination | Preferred mixing ratio | Particularly preferred mixing ratio |
|---|---|---|---|
| 18. | (Ib) + Ethiprole | 25:1 to 1:5 | 20:1 to 1:2 |
| 19. | (Ib) + Abamectin | 50:1 to 5:1 | 35:1 to 10:1 |
| 20. | (Ib) + Emamectin-benzoate | 75:1 to 10:1 | 50:1 to 25:1 |
| 21. | (Ib) + Fluensulfone | 1:1 to 1:20 | 1:4 to 1:16 |
| 22. | (Ib) + Dimethyl-disulfide | 1:500 to 1:2000 | 1:694 to 1:1820 |
| 23. | (Ib) + 1-{2-fluoro-4-methyl-5-[(2,2,2-trifluoroethyl)sulfinyl]phenyl}-3-(trifluoromethyl)-1H-1,2,4-triazol-5-amine | 10:1 to 1:1 | 5:1 to 2:1 |
| 24. | (Ib) + Triflumezopyrim | 750:1 to 1:15 | 500:1 to 1:8 |
| 25. | (Ib) + Iprodione | 1:1 to 1:30 | 1:2 to 1:24 |
| 26. | (Ib) + Fluopyram | 10:1 to 1:10 | 5:1 to 1:4 |
| 27. | (Ib) + 8-chloro-N-[(2-chloro-5-methoxyphenyl)sulfonyl]-6-(trifluoromethyl)imidazo[1,2-a]pyridine-2-carboxamide | 7500:1 to 1:50 | 5000:1 to 1:32 |
| 28. | (Ib) + Tioxazafen | 7500:1 to 1:50 | 5000:1 to 1:32 |
| 29. | (Ib) + *Pasteuria penetrans* | 30:1 to 1:1 | 25:1 to 2.5:1 |
| 30. | (Ib) + *Pasteuria nishizawae* | 30:1 to 1:1 | 25:1 to 2.5:1 |
| 31. | (Ib) + *Pasteuria usgae* | 30:1 to 1:1 | 25:1 to 2.5:1 |
| 32. | (Ib) + *Pasteuria* spp. Pr3 | 30:1 to 1:1 | 25:1 to 2.5:1 |
| 33. | (Ib) + *Myrothecium verrucaria* | 1:20 to 1:500 | 1:28 to 1:423 |
| 34. | (Ib) + *Flavobacterium* MBI-302 | 30:1 to 1:1 | 25:1 to 2.5:1 |
| 35. | (Ib) + SERENADE ® soil/DPZ ™ (*Bacillus subtilis* QST713) | 15:1 to 1:20 | 8:1 to 1.5:1 |
| 36. | (Ib) + *Paecilomyces lilacinus* | 5:1 to 1:1 | 3.5:1 to 2:1 |
| 37. | (Ib) + *Bacillus firmus* I-1582 | 1:100 to 1:500 | 1:160 to 1:320 |
| 38. | (Ib) + Azadirachtin | 10:1 to 1:20 | 5:1 to 2:1 |

Further especially preferred active ingredient combinations are those shown in Table Bc. The preferred and particularly preferred mixing ratios indicated in the table are weight ratios. The ratio should be understood in each case as compound of the formula (Ic) to mixing partner 1 to 38.

TABLE Bc

| No. | Combination | Preferred mixing ratio | Particularly preferred mixing ratio |
|---|---|---|---|
| 1. | (Ic) + Imidacloprid | 20:1 to 1:5 | 5:1 to 1:2.5 |
| 2. | (Ic) + Clothianidin | 100:1 to 1:5 | 4:1 to 1:2 |
| 3. | (Ic) + Thiacloprid | 15:1 to 1:1 | 10:1 to 2:1 |
| 4. | (Ic) + Sulfoxaflor | 75:1 to 1:1 | 50:1 to 2.5:1 |
| 5. | (Ic) + Flupyradifurone 4-{[(6-chloropyrid-3-yl)methyl](2,2-difluoroethyl)amino}furan-2(5H)-one | 10:1 to 1:10 | 5:1 to 1:4 |
| 6. | (Ic) + Carbofuran | 1:1 to 1:50 | 1:2 to 1:30 |
| 7. | (Ic) + Thiodicarb | 5:1 to 1:10 | 1:1 to 1:4 |
| 8. | (Ic) + Oxamyl | 5:1 to 1:25 | 1:1 to 1:20 |
| 9. | (Ic) + Cadusafos | 1:1 to 1:25 | 1:4 to 1:20 |
| 10. | (Ic) + Fosthiazate | 1:1 to 1:20 | 1:3 to 1:12 |
| 11. | (Ic) + Imicyafos | 1:1 to 1:20 | 1:6 to 1:12 |
| 12. | (Ic) + Tefluthrin | 10:1 to 1:1 | 5:1 to 2:1 |
| 13. | (Ic) + Chlorantraniliprole (FCH 1557) | 25:1 to 1:1 | 17:1 to 2:1 |
| 14. | (Ic) + Cyantraniliprole (FCH 1706) | 25:1 to 1:1 | 17:1 to 2:1 |
| 15. | (Ic) + Flubendiamide | 25:1 to 1:1 | 17:1 to 2:1 |
| 16. | (Ic) + 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | 25:1 to 1:1 | 20:1 to 2:1 |
| 17. | (Ic) + Fipronil | 15:1 to 1:1 | 10:1 to 2:1 |
| 18. | (Ic) + Ethiprole | 25:1 to 1:5 | 20:1 to 1:2 |

TABLE Bc-continued

| No. | Combination | Preferred mixing ratio | Particularly preferred mixing ratio |
|---|---|---|---|
| 19. | (Ic) + Abamectin | 50:1 to 5:1 | 35:1 to 10:1 |
| 20. | (Ic) + Emamectin-benzoate | 75:1 to 10:1 | 50:1 to 25:1 |
| 21. | (Ic) + Fluensulfone | 1:1 to 1:20 | 1:4 to 1:16 |
| 22. | (Ic) + Dimethyl-disulfide | 1:500 to 1:2000 | 1:694 to 1:1820 |
| 23. | (Ic) + 1-{2-fluoro-4-methyl-5-[(2,2,2-trifluoroethyl)sulfinyl]phenyl}-3-(trifluoromethyl)-1H-1,2,4-triazol-5-amine | 10:1 to 1:1 | 5:1 to 2:1 |
| 24. | (Ic) + Triflumezopyrim | 750:1 to 1:15 | 500:1 to 1:8 |
| 25. | (Ic) + Iprodione | 1:1 to 1:30 | 1:2 to 1:24 |
| 26. | (Ic) + Fluopyram | 10:1 to 1:10 | 5:1 to 1:4 |
| 27. | (Ic) + 8-chloro-N-[(2-chloro-5-methoxyphenyl)sulfonyl]-6-(trifluoromethyl)imidazo[1,2-a]pyridine-2-carboxamide | 7500:1 to 1:50 | 5000:1 to 1:32 |
| 28. | (Ic) + Tioxazafen | 7500:1 to 1:50 | 5000:1 to 1:32 |
| 29. | (Ic) + *Pasteuria penetrans* | 30:1 to 1:1 | 25:1 to 2.5:1 |
| 30. | (Ic) + *Pasteuria nishizawae* | 30:1 to 1:1 | 25:1 to 2.5:1 |
| 31. | (Ic) + *Pasteuria usgae* | 30:1 to 1:1 | 25:1 to 2.5:1 |
| 32. | (Ic) + *Pasteuria* spp. Pr3 | 30:1 to 1:1 | 25:1 to 2.5:1 |
| 33. | (Ic) + *Myrothecium verrucaria* | 1:20 to 1:500 | 1:28 to 1:423 |
| 34. | (Ic) + *Flavobacterium* MBI-302 | 30:1 to 1:1 | 25:1 to 2.5:1 |
| 35. | (Ic) + SERENADE ® soil/DPZ ™ (*Bacillus subtilis* strain QST713) | 15:1 to 1:20 | 8:1 to 1.5:1 |
| 36. | (Ic) + *Paecilomyces lilacinus* | 5:1 to 1:1 | 3.5:1 to 2:1 |
| 37. | (Ic) + *Bacillus firmus* I-1582 | 1:100 to 1:500 | 1:160 to 1:320 |
| 38. | (Ic) + Azadirachtin | 10:1 to 1:20 | 5:1 to 2:1 |

Further preferred mixing ratios in which a compound of the formula (I) is combined with the compounds or biological control agents 1 to 38 indicated in Table A are 2000:1 to 1:2000, 1000:1 to 1:1000, 750:1 to 1:750, 500:1 to 1:500, 250:1 to 1:250, 200:1 to 1:200, 100:1 to 1:100, 95:1 to 1:95, 90:1 to 1:90, 85:1 to 1:85, 80:1 to 1:80, 75:1 to 1:75, 70:1 to 1:70, 65:1 to 1:65, 60:1 to 1:60, 55:1 to 1:55, 45:1 to 1:45, 40:1 to 1:40, 35:1 to 1:35, 30:1 to 1:30, 20:1 to 1:20, 15:1 to 1:15, 10:1 to 1:10, 9:1 to 1:9, 8:1 to 1:8, 7:1 to 1:7, 6:1 to 1:6, 4:1 to 1:4, 3:1 to 1:3, 2:1 to 1:2, 1:1.

If the short form of the common name of an active ingredient is used in the context of this description, this also refers in each case to all common derivatives, such as the esters and salts, and isomers, especially optical isomers, more particularly the commercial form or forms. If an ester or salt is referred to by the common name, this also refers in each case to all other common derivatives, such as other esters and salts, the free acids and neutral compounds, and isomers, especially optical isomers, especially the commercial form or forms. The stated chemical compound names identify at least one of the compounds embraced by the common name, frequently a preferred compound.

The active ingredient combinations of the invention are very suitable for controlling animal pests or nematodes.

Surprisingly, the insecticidal and/or acaricidal and/or nematocidal effect, or the fungicidal effect and/or the plant-strengthening and/or yield-boosting effect, of the active ingredient combinations of the invention is substantially higher than the sum of the effects of the individual active ingredients. There is an unforeseeable, true synergistic effect, and not merely an addition of effects.

Furthermore, the insecticidal and/or nematocidal mixtures according to the invention can be mixed with herbicides, and/or fungicides, and/or plant health strengtheners. The same applies in respect of the mixtures according to the invention, especially those listed in Table A, which may likewise be mixed with the herbicides, and/or fungicides, and/or plant health strengtheners and applied to plants or parts of plants. In many cases these mixtures with herbicides and/or fungicides, and/or plant health strengtheners have synergistic effects.

The active ingredient combinations of the invention combine good tolerance by plants, favourable toxicity to warm-blooded animals and high environmental compatibility with suitability for protection of plants and plant organs, for the boosting of harvest yields, improvement in the quality of the harvested material and for the control of animal pests, more particularly insects, arachnids, helminths, nematodes and molluscs that occur in agriculture, in horticulture, in animal keeping, in forests, in gardens and leisure facilities, in the protection of stored and other materials, and in the hygiene sector. They can be used with preference as crop protection agents. They are effective against normally sensitive and resistant species and against all or some stages of development. The abovementioned pests include the following:

pests from the phylum of the Arthropoda, more particularly
from the class of the Arachnida, e.g. *Acarus* spp., *Aceria kuko, Aceria sheldoni, Aculops* spp., *Aculus* spp., *Amblyomma* spp., *Amphitetranychus viennensis, Argas* spp., *Boophilus* spp., *Brevipalpus* spp., *Bryobia graminum, Bryobia praetiosa, Centruroides* spp., *Chorioptes* spp., *Dermanyssus gallinae, Dermatophagoides pteronyssinus, Dermatophagoides farinae, Dermacentor* spp., *Eotetranychus* spp., *Epitrimerus pyri, Eutetranychus* spp., *Eriophyes* spp., *Glycyphagus domesticus, Halotydeus destructor, Hemitarsonemus* spp., *Hyalomma* spp., *Ixodes* spp., *Latrodectus* spp., *Loxosceles* spp., *Metatetranychus* spp., *Neutrombicula autumnalis, Nuphersa* spp., *Oligonychus* spp., *Ornithodorus* spp., *Ornithonyssus* spp., *Panonychus* spp., *Phyllocoptruta oleivora, Platytetranychus multidigituli, Polyphagotarsonemus latus, Psoroptes* spp., *Rhipicephalus* spp., *Rhizoglyphus* spp., *Sarcoptes* spp., *Scorpio maurus, Steneotarsonemus* spp., *Steneotarsonemus spinki, Tarsonemus* spp., *Tetranychus* spp., *Trombicula alfreddugesi, Vaejovis* spp., *Vasates lycopersici;* from the class of the Chilopoda, e.g. *Geophilus* spp., *Scutigera* spp.;

from the order or the class of the Collembola, e.g. *Onychiurus armatus;* from the class of the Diplopoda, e.g. *Blaniulus guttulatus;* from the class of the Insecta, e.g. from the order of the Blattodea, e.g. *Blattella asahinai, Blattella germanica, Blatta orientalis, Leucophaea maderae (Rhypaobia maderae), Panchlora* spp., *Parcoblatta* spp., *Periplaneta* spp., *Supella longipalpa, Loboptera decipiens, Neostylopyga rhombifolia, Pycnoscelus surinamensis;* from the order of the Coleoptera, e.g. *Acalymma vittatum, Acanthoscelides obtectus, Adoretus* spp., *Agelastica alni, Agriotes* spp., *Alphitobius diaperinus, Amphimallon solstitialis, Anobium punctatum, Anoplophora* spp., *Anthonomus* spp., *Anthrenus* spp., *Apion* spp., *Apogonia* spp., *Atomaria* spp., *Attagenus* spp., *Baris caerulescens, Bruchidius obtectus, Bruchus* spp., *Cassida* spp., *Cerotoma trifurcata, Ceutorrhynchus* spp., *Chaetocnema* spp., *Cleonus mendicus, Conoderus* spp., *Cosmopolites* spp., *Costelytra zealandica, Ctenicera* spp., *Curculio* spp., *Cryptolestes ferrugineus, Cryptorhynchus lapathi, Cylindrocopturus* spp., *Dermestes* spp., *Diabrotica* spp., *Dichocrocis* spp., *Dicladispa armigera, Diloboderus* spp., *Epilachna* spp., *Epitrix* spp., *Faustinus* spp., *Gibbium psylloides, Gnathocerus cornutus, Hellula undalis, Heteronychus arator, Heteronyx* spp., *Hylamorpha elegans, Hylotrupes bajulus, Hypera postica, Hypomeces squamosus, Hypothenemus* spp., *Lachnosterna consanguinea, Lasioderma serricorne, Latheticus oryzae, Lathridius* spp., *Lema* spp., *Leptinotarsa decemlineata, Leucoptera* spp., *Lissorhoptrus oryzophilus, Listronotus* (=*Hyperodes*) spp., *Lixus* spp., *Luperomorpha xanthodera, Luperodes* spp., *Lyctus* spp., *Megascelis* spp., *Melanotus* spp., *Meligethes aeneus, Melolontha* spp., *Migdolus* spp., *Monochamus* spp., *Naupactus xanthographus, Necrobia* spp., *Niptus hololeucus, Oryctes rhinoceros, Oryzaephilus surinamensis, Oryzaphagus oryzae, Otiorrhynchus* spp., *Oxycetonia jucunda, Phaedon cochleariae, Phyllophaga* spp., *Phyllophaga helleri, Phyllotreta* spp., *Popillia japonica, Premnotrypes* spp., *Prostephanus truncatus, Psylliodes* spp., *Ptinus* spp., *Rhizobius ventralis, Rhizopertha dominica, Sitophilus* spp., *Sitophilus oryzae, Sphenophorus* spp., *Stegobium paniceum, Sternechus* spp., *Symphyletes* spp., *Tanymecus* spp., *Tenebrio molitor, Tenebrioides mauretanicus, Tribolium* spp., *Trogoderma* spp., *Tychius* spp., *Xylotrechus* spp., *Zabrus* spp., *Aethina tumida, Epicaerus* spp., *Neogalerucella* spp., *Oulema* spp., *Oulema oryzae, Rhynchophorus* spp., *Rhynchophorus ferrugineus, Rhynchophorus palmarum, Sinoxylon perforans;* from the order of the Diptera, e.g. *Aedes* spp., *Agromyza* spp., *Anastrepha* spp., *Anopheles* spp., *Asphondylia* spp., *Bactrocera* spp., *Bibio hortulanus, Calliphora erythrocephala, Calliphora vicina, Ceratitis capitata, Chironomus* spp., *Chrysomyia* spp., *Chrysops* spp., *Chrysozona pluvialis, Cochliomyia* spp., *Contarinia* spp., *Cordylobia anthropophaga, Cricotopus sylvestris, Culex* spp., *Culicoides* spp., *Culiseta* spp., *Cuterebra* spp., *Dacus oleae, Dasyneura* spp., *Delia* spp., *Dermatobia hominis, Drosophila* spp., *Echinocnemus* spp., *Fannia* spp., *Gasterophilus* spp., *Glossina* spp., *Haematopota* spp., *Hydrellia* spp., *Hydrellia griseola, Hylemya* spp., *Hippobosca* spp., *Hypoderma* spp., *Liriomyza* spp., *Lucilia* spp., *Lutzomyia* spp., *Mansonia* spp., *Musca* spp., *Oestrus* spp., *Oscinella frit, Paratanytarsus* spp., *Paralauterborniella subcincta, Pegomyia* spp., *Phlebotomus* spp., *Phorbia* spp., *Phormia* spp., *Piophila casei, Prodiplosis* spp., *Psila rosae, Rhagoletis* spp., *Sarcophaga* spp., *Simulium* spp., *Stomoxys* spp., *Tabanus* spp., *Tetanops* spp., *Tipula* spp., *Ceratitis* spp., *Drosophila suzukii, Euleia heraclei, Platyparea poeciloptera, Pupipara, Toxotrypana curvicauda;* from the order of the Heteroptera, e.g. *Anasa tristis, Antestiopsis* spp., *Boisea* spp., *Blissus* spp., *Calocoris* spp., *Campylomma livida, Cavelerius* spp., *Cimex* spp., *Collaria* spp., *Creontiades dilutus, Dasynus piperis, Dichelops furcatus, Diconocoris hewetti, Dysdercus* spp., *Euschistus* spp., *Eurygaster* spp., *Heliopeltis* spp., *Horcias nobilellus, Leptocorisa* spp., *Leptocorisa varicornis, Leptoglossus occidentalis, Leptoglossus phyllopus, Lygus* spp., *Macropes excavatus, Miridae, Monalonion atratum, Nezara* spp., *Oebalus* spp., *Pentomidae, Piesma quadrata, Piezodorus* spp., *Psallus* spp., *Pseudacysta persea, Rhodnius* spp., *Sahlbergella singularis, Scaptocoris castanea, Scotinophora* spp., *Stephanitis nashi, Tibraca* spp., *Triatoma* spp., *Aelia* spp., *Eurydema* spp., *Halyomorpha halys, Leptoglossus* spp., *Megacopta cribraria, Nysius* spp.;

from the order of the Homoptera, e.g. *Acizzia acaciaebaileyanae, Acizzia dodonaeae, Acizzia uncatoides, Acrida turrita, Acyrthosipon* spp., *Acrogonia* spp., *Aeneolamia* spp., *Agonoscena* spp., *Aleyrodes proletella, Aleurolobus barodensis, Aleurothrixus floccosus, Allocaridara malayensis, Amrasca* spp., *Anuraphis cardui, Aonidiella* spp., *Aphanostigma piri, Aphis* spp., *Arboridia apicalis, Arytai-* nilla spp., Aspidiella spp., Aspidiotus spp., Atanus spp., Aulacorthum solani, Bemisia tabaci, Blastopsylla occidentalis, Boreioglycaspis melaleucae, Brachycaudus helichrysi, Brachycolus spp., Brevicoryne brassicae, Cacopsylla spp., Calligypona marginata, Capulinia spp., Carneocephala fulgida, Ceratovacuna lanigera, Cercopidae, Ceroplastes spp., Chaetosiphon fragaefolii, Chionaspis tegalensis, Chlorita onukii, Chondracris rosea, Chromaphis juglandicola, Chrysomphalus ficus, Cicadulina mbila, Coccomytilus halli, Coccus spp., Cryptomyzus ribis, Cryptoneossa spp., Ctenarytaina spp., Dalbulus spp., Dialeurodes citri, Diaphorina citri, Diaspis spp., Drosicha spp., Dysaphis spp., Dysmicoccus spp., Empoasca spp., Eriosoma spp., Erythroneura spp., Eucalyptolyma spp., Euphyllura spp., Euscelis bilobatus, Ferrisia spp., Geococcus coffeae, Glycaspis spp., Heteropsylla cubana, Heteropsylla spinulosa, Homalodisca coagulata, Hyalopterus arundinis, Icerya spp., Idiocerus spp., Idioscopus spp., Laodelphax striatellus, Lecanium spp., Lepidosaphes spp., Lipaphis erysimi, Macrosiphum spp., Macrosteles facifrons, Mahanarva spp., Melanaphis sacchari, Metcalfiella spp., Metopolophium dirhodum, Monellia costalis, Monelliopsis pecanis, Myzus spp., Nasonovia ribisnigri, Nephotettix spp., Nettigoniclla spectra, Nilaparvata lugens, Oncometopia spp., Orthezia praelonga, Oxya chinensis, Pachypsylla spp., Parabemisia myricae, Paratrioza spp., Parlatoria spp., Pemphigus spp., Peregrinus maidis, Phenacoccus spp., Phloeomyzus passerinii, Phorodon humuli, Phylloxera spp., Pinnaspis aspidistrae, Planococcus spp., Prosopidopsylla flava, Protopulvinaria pyriformis, Pseudaulacaspis pentagona, Pseudococcus spp., Psyllopsis spp., Psylla spp., Pteromalus spp., Pyrilla spp., Quadraspidiotus spp., Quesada gigas, Rastrococcus spp., Rhopalosiphum spp., Saissetia spp., Scaphoideus titanus, Schizaphis graminum, Selenaspidus articulatus, Sogata spp., Sogatella furcifera, Sogatodes spp., Stictocephala festina, Siphoninus phillyreae, Tenalaphara malayensis, Tetragonocephela spp., Tinocallis caryaefoliae, Tomaspis spp., Toxoptera spp., Trialeurodes vaporariorum, Trioza spp., Typhlocyba spp., Unaspis spp., Viteus vitifolii, Zygina spp., Aleurocanthus spp., Chrysomphalus aonidum, Dialeurodes chittendeni, Diuraphis spp., Fiorinia spp, Furcaspis oceanica, Lopholeucaspis japonica, Neomaskellia spp., Perkinsiella spp., Pulvinaria spp.;

from the order of the Hymenoptera, e.g. Acromyrmex spp., Athalia spp., Atta spp., Diprion spp., Hoplocampa spp., Lasius spp., Monomorium pharaonis, Sirex spp., Solenopsis invicta, Tapinoma spp., Urocerus spp., Vespa spp., Xeris spp., Camponotus spp., Dolichovespula spp., Linepithema (Iridiomyrmex) humile, Paratrechina spp., Paravespula spp., Plagiolepis spp., Technomyrmex albipes, Wasmannia auropunctata;

from the order of the Isopoda, e.g. Armadillidium vulgare, Oniscus asellus, Porcellio scaber;

from the order of the Isoptera, e.g. Coptotermes spp., Cornitermes cumulans, Cryptotermes spp., Incisitermes spp., Microtermes obesi, Odontotermes spp., Reticulitermes spp.; Kalotermes spp., Nasutitermes spp., Porotermes spp., from the order of the Lepidoptera, e.g. Achroia grisella, Acronicta major, Adoxophyes spp., Aedia leucomelas, Agrotis spp., Alabama spp., Amyelois transitella, Anarsia spp., Anticarsia spp., Argyroploce spp., Barathra brassicae, Borbo cinnara, Bucculatrix thurberiella, Bupalus piniarius, Busseola spp., Cacoecia spp., Caloptilia theivora, Capua reticulana, Carpocapsa pomonella, Carposina niponensis, Cheimatobia brumata, Chilo spp., Choristoneura spp., Clysia ambiguella, Cnaphalocerus spp., Cnaphalocrocis medinalis, Cnephasia spp., Conopomorpha spp., Conotrachelus spp., Copitarsia spp., Cydia spp., Dalaca noctuides, Diaphania spp., Diatraea saccharalis, Earias spp., Ecdytolopha aurantium, Elasmopalpus lignosellus, Eldana saccharina, Ephestia spp., Epinotia spp., Epiphyas postvittana, Etiella spp., Eulia spp., Eupoecilia ambiguella, Euproctis spp., Euxoa spp., Feltia spp., Galleria mellonella, Gracillaria spp., Grapholitha spp., Hedylepta spp., Helicoverpa spp., Heliothis spp., Hofmannophila pseudospretella, Homoeosoma spp., Homona spp., Hyponomeuta padella, Kakivoria flavofasciata, Laphygma spp., Laspeyresia molesta, Leucinodes orbonalis, Leucoptera spp., Lithocolletis spp., Lithophane antennata, Lobesia spp., Loxagrotis albicosta, Lymantria spp., Lyonetia spp., Malacosoma neustria, Maruca testulalis, Mamstra brassicae, Melanitis leda, Mocis spp., Monopis obviella, Mythimna separata, Nemapogon cloacellus, Nymphula spp., Oiketicus spp., Oria spp., Orthaga spp., Ostrinia spp., Panolis flammea, Parnara spp., Pectinophora spp., Perileucoptera spp., Phthorimaea spp., Phyllocnistis citrella, Phyllonorycter spp., Pieris spp., Platynota stultana, Plodia interpunctella, Plusia spp., Plutella xylostella, Prays spp., Prodenia spp., Protoparce spp., Pseudaletia spp., Pseudaletia unipuncta, Pseudoplusia includens, Pyrausta nubilalis, Rachiplusia nu, Schoenobius spp., Scirpophaga spp., Scirpophaga innotata, Scotia segetum, Sesamia spp., Sesamia inferens, Sparganothis spp., Spodoptera spp., Spodoptera praefica, Stathmopoda spp., Stomopteryx subsecivella, Synanthedon spp., Tecia solanivora, Thermesia gemmatalis, Tinea cloacella, Tinea pellionella, Tineola bisselliella, Tortrix spp., Trichophaga tapetzella, Trichoplusia spp., Tryporyza incertulas, Tuta absoluta, Virachola spp., Autographa spp., Blastodacna atra, Choreutis pariana, Chrysodeixis chalcites, Diparopsis spp., Erannis spp., Erschoviella musculana, Eudocima spp., Lampides spp., Maruca spp., Omphisa spp., Operophtera spp., Stenoma spp., Thaumetopoea spp.;

from the order of the Orthoptera or Saltatoria, e.g. Acheta domesticus, Dichroplus spp., Gryllotalpa spp., Hieroglyphus spp., Locusta spp., Melanoplus spp., Schistocerca gregaria;

from the order of the Phthiraptera, e.g. Damalinia spp., Haematopinus spp., Linognathus spp., Pediculus spp., Phylloera vastatrix, Phtirus pubis, Trichodectes spp.;

from the order of the Psocoptera, e.g. Lepinotus spp., Liposcelis spp.;

from the order of the Siphonaptera, e.g. Ceratophyllus spp., Ctenocephalides spp., Pulex irritans, Tunga penetrans, Xenopsylla cheopsis;

from the order of the Thysanoptera, e.g. Anaphothrips obscurus, Baliothrips biformis, Drepanothrips reuteri, Enneothrips flavens, Frankliniella spp., Heliothrips spp., Hercinothrips femoralis, Rhipiphorothrips cruentatus, Scirtothrips spp., Taeniothrips cardamomi, Thrips spp., Chaetanaphothrips leeuweni, Haplothrips spp.;

from the order of the Zygentoma (=Thysanura), e.g. Ctenolepisma spp., Lepisma saccharina, Lepismodes inquilinus, Thermobia domestica;

from the class of the Symphyla, e.g. Scutigerella spp.;

pests from the phylum of the Mollusca, more particularly from the class of the Bivalvia, e.g. Dreissena spp., and also from the class of the Gastropoda, e.g. Anion spp., Biomphalaria spp., Bulinus spp., Deroceras spp., Galba spp., Lymnaea spp., Oncomelania spp., Pomacea spp., Succinea spp.;

animal parasites from the phylae of the Plathelminthes and Nematoda, e.g. Ancylostoma duodenale, Ancylostoma ceylanicum, Ancylostoma braziliensis, Ancylostoma spp., Ascaris spp., Brugia malayi, Brugia timori, Bunostomum spp., Chabertia spp., Clonorchis spp., Cooperia spp., Dicrocoelium spp., Dictyocaulus filaria, Diphyllobothrium latum, Dracunculus medinensis, Echinococcus granulosus, Echinococcus multilocularis, Enterobius vermicularis, Faciola spp., Haemonchus spp., Heterakis spp., Hymenolepis nana, Hyostrongulus spp., Loa Loa, Nematodirus spp., Oesophagostomum spp., Opisthorchis spp., Onchocerca volvulus, Ostertagia spp., Paragonimus spp., Schistosomen spp., Strongyloides fuelleborni, Strongyloides stercoralis, Strongyloides spp., Taenia saginata, Taenia solium, Trichinella spiralis, Trichinella nativa, Trichinella britovi, Trichinella nelsoni, Trichinella pseudopsiralis, Trichostrongulus spp., Trichuris trichiura, Wuchereria bancrofti;

plant pests from the phylum of the Nematoda, i.e. plant-parasitic nematodes, more particularly Aphelenchoides spp., Bursaphelenchus spp., Ditylenchus spp., Globodera spp., Heterodera spp., Longidorus spp., Meloidogyne spp., Pratylenchus spp., Radopholus spp., Trichodorus spp., Tylenchulus spp., Xiphinema spp., Helicotylenchus spp., Tylenchorhynchus spp., Scutellonema spp., Paratrichodorus spp., Meloinema spp., Paraphelenchus spp., Aglenchus spp., Belonolaimus spp., Nacobbus spp., Rotylenchulus spp., Rotylenchus spp., Neotylenchus spp., Dolichodorus spp., Hoplolaimus spp., Punctodera spp., Criconemella spp., Quinisulcius spp., Hemicycliophora spp., Anguina spp., Subanguina spp., Hemicriconemoides spp., Psilenchus spp., Pseudohalenchus spp., Criconemoides spp., Cacopaurus spp., Paralongidorus spp.

Furthermore, from the sub-kingdom of the Protozoa, the order of the Coccidia, e.g. Eimeria spp. can be controlled.

The present invention further relates to formulations and use forms prepared therefrom as crop protection compositions and/or pesticides, for example drench, drip and spray liquors, comprising at least one of the inventive active ingredients. The use forms optionally comprise further crop protection agents and/or pesticides and/or effect-improving adjuvants such as penetrants, examples being vegetable oils such as rapeseed oil and sunflower oil, for example, mineral oils such as liquid paraffins, for example, alkyl esters of vegetable fatty acids, such as rapeseed oil methyl ester or soybean oil methyl ester, for example, or alkanol alkoxylates, and/or spreaders such as, for example, alkylsiloxanes and/or salts, examples being organic or inorganic ammonium salts or phosphonium salts such as, for example, ammonium sulphate or diammonium hydrogenphosphate, and/or retention promoters such as dioctyl sulphosuccinate or hydroxypropylguar polymers and/or humectants such as, for example, glycerol and/or fertilizers such as, for example, ammonium, potassium- or phosphorus-containing fertilizers.

In the formulations the compounds of the formula (I) are often present not in the NH form but instead as salts, for example as alkali metal salts or ammonium salts.

Customary formulations are, for example, water-soluble liquids (SL), emulsion concentrates (EC), emulsions in water (EW), suspension concentrates (SC, SE, FS, OD), water-dispersible granules (WG), granules (GR) and capsule concentrates (CS); these and further possible formulation types are described, for example, by Crop Life International and in Pesticide Specifications, Manual on development and use of FAO and WHO specifications for pesticides, FAO Plant Production and Protection Papers—173, prepared by the FAO/WHO Joint Meeting on Pesticide Specifications, 2004, ISBN: 9251048576. The formulations, besides one or more active ingredients of the invention, optionally comprise further active agrochemical ingredients.

These are preferably formulations or use forms which comprise auxiliaries, for example extenders, solvents, spontaneity promoters, carriers, emulsifiers, dispersants, frost protectants, biocides, thickeners and/or further auxiliaries, for example adjuvants. An adjuvant in this context is a component which enhances the biological effect of the formulation, without the component itself having a biological effect.

Examples of adjuvants are agents which promote retention, spreading, attachment to the leaf surface or penetration.

These formulations are prepared in a known way, for example by mixing the active ingredients with auxiliaries such as, for example, extenders, solvents and/or solid carriers and/or other auxiliaries such as, for example, surfactants. The formulations are prepared either in suitable installations or else before or during application.

The auxiliaries used may be substances suitable for imparting special properties, such as certain physical, technical and/or biological properties, to the formulation of the active ingredient, or to the use forms prepared from these formulations (for example ready-to-use crop protection compositions such as spray liquors or seed dressing products).

Suitable extenders are, for example, water, polar and nonpolar organic chemical liquids, for example from the classes of the aromatic and non-aromatic hydrocarbons (such as paraffins, alkylbenzenes, alkylnaphthalenes, chlorobenzenes), the alcohols and polyols (which, if appropriate, may also be substituted, etherified and/or esterified), the ketones (such as acetone, cyclohexanone), esters (including fats and oils) and (poly)ethers, the unsubstituted and substituted amines, amides, lactams (such as N-alkylpyrrolidones) and lactones, the sulphones and sulphoxides (such as dimethyl sulphoxide).

Where water is used as an extender, it is also possible for organic solvents, for example, to be used as auxiliary solvents. Essentially, suitable liquid solvents are: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, mineral and vegetable oils, alcohols such as butanol or glycol and their ethers and esters, ketones such as acetone, methyl ethyl ketone, methyl isobutyl ketone or cyclohexanone, strongly polar solvents such as dimethylformamide and dimethyl sulphoxide, and also water.

In principle it is possible to use all suitable solvents. Examples of suitable solvents are aromatic hydrocarbons, such as xylene, toluene or alkylnaphthalenes, chlorinated aromatic or chlorinated aliphatic hydrocarbons, such as chlorobenzene, chloroethylene or methylene chloride, aliphatic hydrocarbons, such as cyclohexane, paraffins, petroleum fractions, mineral and vegetable oils, alcohols, such as methanol, ethanol, isopropanol, butanol or glycol and their ethers and esters, ketones such as acetone, methyl ethyl ketone, methyl isobutyl ketone or cyclohexanone, strongly polar solvents, such as dimethyl sulphoxide, and also water.

In principle it is possible to use all suitable carriers. Suitable carriers include more particularly the following: e g ammonium salts and natural, finely ground rocks, such as kaolins, aluminas, talc, chalk, quartz, attapulgite, montmorillonite or diatomaceous earth, and synthetic, finely ground rocks, such as highly disperse silica, aluminium oxide and natural or synthetic silicates, resins, waxes and/or solid fertilizers. Mixtures of such carriers can likewise be used. Useful carriers for granules include: for example crushed and fractionated natural rocks such as calcite, marble, pumice, sepiolite, dolomite, and synthetic granules of inorganic and organic meals, and also granules of organic material such as sawdust, paper, coconut shells, maize cobs and tobacco stalks.

Liquefied gaseous extenders or solvents can also be used. Particularly suitable extenders or carriers are those which are gaseous at ambient temperature and under atmospheric pressure, for example aerosol propellant gases, such as halohydrocarbons, and also butane, propane, nitrogen and carbon dioxide.

Examples of emulsifiers and/or foam generators, dispersants or wetting agents having ionic or nonionic properties, or mixtures of these surfactants, are salts of polyacrylic acid, salts of lignosulphonic acid, salts of phenosulphonic acid or naphthalenesulphonic acid, polycondensates of ethylene oxide with fatty alcohols or with fatty acids or with fatty amines, with substituted phenols (preferably alkylphenols or arylphenols), salts of sulphosuccinic esters, taurine derivatives (preferably alkyltaurates), phosphoric esters of polyethoxylated alcohols or phenols, fatty acid esters of polyols, and derivatives of the compounds comprising sulphates, sulphonates and phosphates, e.g. alkylaryl polyglycol ethers, alkylsulphonates, alkyl sulphates, arylsulphonates, protein hydrolysates, lignin sulphite waste liquors, and methylcellulose. The presence of a surfactant is advantageous if one of the active compounds and/or one of the inert carriers is insoluble in water and when the application takes place in water.

It is possible to use colourants such as inorganic pigments, for example iron oxide, titanium oxide and Prussian Blue, and organic dyes such as alizarin dyes, azo dyes and metal phthalocyanine dyes, and nutrients and trace nutrients such as salts of iron, manganese, boron, copper, cobalt, molybdenum and zinc as further auxiliaries in the formulations and the use forms derived therefrom.

Additional components may be stabilizers, such as cold stabilizers, preservatives, antioxidants, light stabilizers, or other agents which improve chemical and/or physical stability. Foam formers or antifoams may also be present.

Stickers such as carboxymethylcellulose and natural and synthetic polymers in the form of powders, granules or latices, such as gum arabic, polyvinyl alcohol and polyvinyl acetate, or else natural phospholipids such as cephalins and lecithins and synthetic phospholipids may also be present as additional auxiliaries in the formulations and the use forms derived therefrom. Further possible auxiliaries are mineral and vegetable oils.

If appropriate, the formulations and the use forms derived therefrom may also comprise further auxiliaries. Examples of such additives include fragrances, protective colloids, binders, adhesives, thickeners, thixotropic agents, penetrants, retention promoters, stabilizers, sequestrants, complexing agents, humectants, spreaders. Generally speaking, the active ingredients may be combined with any solid or liquid adjuvant commonly used for purposes of formulation.

Useful retention promoters include all those substances which reduce the dynamic surface tension, for example dioctyl sulphosuccinate, or increase the viscoelasticity, for example hydroxypropylguar polymers.

Penetrants contemplated in the present context include all those substances which are commonly used to promote the penetration of active agrochemical ingredients into plants. Penetrants are defined in this context as being able to penetrate the cuticle of the plant, from the (in general aqueous) application mixture and/or from the spray covering, and being able thereby to raise the mobility of the active ingredients in the cuticle. The method described in the literature (Baur et al., 1997, Pesticide Science 51, 131-152) may be used for the purpose of determining this quality. Examples include alcohol alkoxylates such as coconut fatty ethoxylate (10) or isotridecyl ethoxylate (12), fatty acid esters, for example rapeseed oil methyl ester or soya oil methyl ester, fatty amine alkoxylates, for example tallowamine ethoxylate (15), or ammonium and/or phosphonium salts, for example ammonium sulphate or diammonium hydrogenphosphate.

The invention can be used to treat all plants and parts of plants. Plants in this context are understood to include all plants and plant populations, such as desired and unwanted wild plants or crop plants (including naturally occurring crop plants). Crop plants may be plants obtainable by conventional breeding and optimization methods or by biotechnological and gene-technological methods, or combinations of these methods, including the transgenic plants and including the plant cultivars protectable or not protectable by plant breeders' rights. The plants which can be treated with the active ingredient combinations of the invention include for example the following types of plants: turf, vines, cereals, for example wheat, barley, rye, oats, rice, maize and millet, triticale; beets, for example sugarbeet and fodder beet; fruits, for example pome fruit, stone fruit and soft fruit, for example apples, pears, plums, peaches, almonds, cherries and berries, e.g. strawberries, raspberries, blackberries; legumes, for example beans, lentils, peas and soyabeans; oil crops, for example oilseed rape, mustard, poppy, olives, sunflowers, coconut, castor oil plants, cocoa beans and peanuts; cucurbits, for example pumpkin/squash, cucumbers and melons; fibre plants, for example cotton, flax, hemp and jute; citrus fruits, for example oranges, lemons, grapefruit and tangerines; vegetables, for example spinach, lettuce, asparagus, cabbages, carrots, onions, tomatoes, potatoes and bell peppers; Lauraceae, for example avocado, cinnamomum, camphor, or plants such as tobacco, nuts, coffee, aubergine, sugar cane, tea, pepper, grapevines, hops, bananas, natural rubber plants, and ornamental plants, for example flowers, shrubs, deciduous trees and coniferous trees such as conifers. This enumeration does not represent any limitation.

Plant parts should be understood to mean all parts and organs of the plants above and below ground, such as shoot, leaf, flower and root, examples given being leaves, needles, stems, flowers, fruit bodies, fruits and seeds, and also tubers, roots and rhizomes. The plant parts also include harvested material, and vegetative and generative propagation material, for example cuttings, tubers, rhizomes, offshoots and seeds.

The treatment of the plants and plant parts in accordance with the invention with the active ingredient combinations takes place directly or by action on their environment, habitat or storage area in accordance with the customary treatment methods, for example by dipping, spraying, atomizing, irrigating, evaporating, dusting, pouring, fogging, broadcasting, foaming, painting, brushing, injecting, drenching, drip irrigating, and, in the case of propagation material, especially in the case of seed, additionally by dry seed dressing, wet seed dressing, slurry seed dressing, by encrusting, or by enveloping with one or more coats.

One preferred direct treatment of the plants is foliar application; in other words, the active ingredient combinations of the invention are applied to the foliage, and the frequency of treatment and the application rate may be adjusted for the infestation pressure of the particular pathogen.

In the case of systemically active compounds, the active ingredient combinations of the invention access the plants via the root system. The plants are then treated by causing the active ingredient combinations of the invention to act on the habitat of the plant. This may be done, for example, by drenching, or by mixing into the soil or the nutrient solution, i.e. the locus of the plant (e.g. soil or hydroponic systems) is impregnated with a liquid form of the active ingredient combinations of the invention, or by soil application, i.e. the active ingredient combinations of the invention are introduced in solid form (e.g. in the form of granules) into the locus of the plants. In the case of paddy rice crops, this can also be done by metering the inventive active ingredients in a solid application form (for example as granules) into a nursery box or flooded paddy field.

The present invention therefore also relates in particular to a method for protecting seed and germinating plants from infestation by pests, by treating the seed with the active ingredient combinations of the invention. The method for the invention for protecting seed and germinating plants from infestation by pests encompasses a method in which the seed is treated simultaneously in one operation with an active ingredient of the formula I and mixing partner. It also encompasses a method in which the seed is treated at different times with an active ingredient of the formula I and mixing partner. It further relates to seed treatment methods using specific stages of water-imbibed seeds (e.g. in rice: dry seeds and pigeon breast seeds).

The invention likewise relates to the use of the active ingredient combinations of the invention for treating seed for the purpose of protecting the seed and the resultant plant from animal pests.

The invention further relates to seed which has been treated with the active ingredient combinations of the invention for the purpose of protection from animal pests. The invention also relates to seed which has been treated at the same time with an active ingredient of the formula I and mixing partner. The invention further relates to seed which has been treated at different times with an active ingredient of formula I and mixing partner. In the case of seed which has been treated at different times with an active ingredient of formula I and mixing partner, the individual active ingredients of the composition of the invention may be present in different layers on the seed. In this case the layers which comprise an active ingredient of formula I and mixing partner may optionally be separated by an intermediate layer. The invention also relates to seed in which an active ingredient of formula I and mixing partner have been applied as a constituent of a shell or as a further layer or further layers in addition to a shell.

The invention further relates to seed which following treatment with the active ingredient combinations of the invention is subjected to a film coating process in order to prevent dust abrasion on the seed.

One of the advantages of the present invention is that by virtue of the particular systemic properties of the compositions of the invention, treatment of the seed with these compositions protects not only the seed itself but also the plants which originate from the seed, following emergence, from animal pests. In this way it is possible to omit the direct treatment of the crop at the time of sowing or shortly thereafter.

A further perceived advantage is that through treatment of the seed with the active ingredient combinations of the invention it is possible to promote germination and emergence of the treated seed.

It is also a perceived advantage that active ingredient combinations of the invention can be employed in particular and also with transgenic seed.

As already mentioned above, all plants and their parts can be treated in accordance with the invention. In a preferred embodiment, wild plant species and plant cultivars, or those obtained by conventional biological breeding, such as crossing or protoplast fusion, and parts thereof, are treated. The traditional methods of propagation and breeding can be assisted or supplemented by one or more biotechnological methods, such as, for example, the use of double haploids, random and directed mutagenesis, molecular or genetic markers, or by bioengineering methods and genetic engineering methods. In a further preferred embodiment, transgenic plants and cultivars obtained by genetic engineering methods optionally in combination with conventional methods (Genetic Modified Organisms) and parts thereof are treated. Genetically modified plants (or transgenic plants) are plants where a heterologous gene has been stably integrated into the genome. The expression "heterologous gene" means essentially a gene which is provided or assembled outside the plant or plant cell and, when it is introduced into the nuclear, chloroplastic or mitochondrial genome, gives the transformed plant new or improved agronomic or other properties, specifically by expressing a protein or polypeptide of interest or by downregulating or silencing one or more other genes present in the plant (using, for example, antisense technology, cosuppression technology, RNA interference (RNAi) technology or microRNA (miRNA) technology). A heterologous gene that has been integrated into the genome is also called a transgene. A transgene which has been integrated into the plant genome is referred to as a transformation event or transgenic event. The terms "parts" and "parts of plants" or "plant parts" have been elucidated above.

The invention is used with particular preference to treat plants of the respective commercially customary cultivars or those that are in use.

Depending on type and cultivar of plant, its locus and growth conditions (soils, climate, vegetation period, nutrition), the treatment according to the invention may also be accompanied by superadditive ("synergistic") effects. Accordingly, for example, reduced application rates and/or extensions to the spectrum of action, and/or a boosting of the action, of the substances and compositions that can be used in accordance with the invention, better plant growth, increased tolerance to high or low temperatures, increased tolerance to drought or to water and/or soil salt content, increased flowering performance, facilitated harvesting, acceleration of maturity, higher harvest yields, larger fruits, greater plant height, more intense green colour of the leaf, earlier flowering, higher quality and/or higher nutritional value on the part of the harvested products, higher sugar concentration in the fruits, greater storage qualities and/or greater ease of processing of the harvested products, are possible, which go beyond the effects actually anticipated.

The preferred transgenic plants and cultivars (those obtained by gene technology) for treatment in accordance with the invention include all plants which as a result of the gene technology modification have acquired genetic material that gives these plants particularly advantageous, valuable traits. Examples of such traits are better plant growth, increased tolerance to high or low temperatures, increased tolerance to drought or to levels of water or soil salinity, increased flowering performance, easier harvesting, accelerated ripening, higher harvest yields, greater quality and/or higher nutrient value of the harvested products, better storage qualities and/or ease of processing of the harvested products. Additional and particularly emphasized examples of such traits are increased defence on the part of the plants with respect to animal and microbial pests, such as toward insects, mites, phytopathogenic fungi, bacteria and/or viruses, and also increased tolerance of the plants toward certain active herbicidal ingredients. Examples of transgenic plants are the important crop plants, such as cereals (wheat, rice), maize, soya beans, potatoes, cotton, oilseed rape, and also fruit plants (with the fruits being apples, pears, citrus fruits and grapes), and particular emphasis is given to maize, soya beans, potatoes, cotton and oilseed rape. Traits that are particularly emphasized are the increased defence of the plants against insects, by means of toxins which form in the plants, especially those generated in the plants by the genetic material from *Bacillus thuringiensis* (e.g. by the genes CryIA(a), CryIA(b), CryIA(c), CryIIA, CryIIIA, CryIIIB2, Cry9c, Cry2Ab, Cry3Bb and CryIF, and also combinations thereof) (hereinafter "Bt plants"). Traits that are also particularly emphasized are the increased tolerance of the plants towards particular active herbicidal ingredients, examples being imidazolinones, sulphonylureas, glyphosate or phosphinotricin (e.g. "PAT" gene). The genes which impart the desired traits in question may also be present in combinations with one another in the transgenic plants. Examples of Bt plants include maize varieties, cotton varieties, soya bean varieties and potato varieties that are sold under the commercial names YIELD GARD (e g maize, cotton, soya beans), KnockOut (e.g. maize), StarLink (e.g. maize), Bollgard (cotton), Nucotn (cotton) and NewLeaf (potatoes). Examples of herbicide-tolerant plants include maize varieties, cotton varieties and soya bean varieties which are sold under the commercial designations Roundup Ready (tolerance to glyphosate e.g. maize, cotton, soya beans), Liberty Link (tolerance to phosphinotricin, e.g. oilseed rape), IMI (tolerance to imidazolinones) and STS (tolerance to sulphonylureas, e.g. maize). Herbicide-resistant plants (bred conventionally for herbicide tolerance) also include the varieties sold under the designation Clearfield (e.g. maize) Of course, these statements also apply to plant cultivars which have these genetic traits or genetic traits which are still to be developed and will be developed and/or marketed in the future.

The plants listed can be treated according to the invention in a particularly advantageous manner with the active compound mixtures according to the invention. The preferred ranges stated above for the active compound combinations also apply to the treatment of these plants. Particular emphasis is given to the treatment of plants with the active compound combinations specifically mentioned in the present text.

The good effect of the active ingredient combinations of the invention is apparent from the examples which follow. Whereas the individual active ingredients exhibit weaknesses in their effect, the combinations display an effect which goes beyond a simple summation of effects.

A synergistic effect is present whenever the effect of the active ingredient combinations is greater than the sum of the effects of the active ingredients applied individually.

The following examples show the preparation of the compounds of formula (I) according to the invention.

PREPARATION EXAMPLES

Preparation of N-[1-(2,6-difluorophenyl)-1H-pyrazol-3-yl]-2(trifluoromethyl)benzamide (compound (Ia))

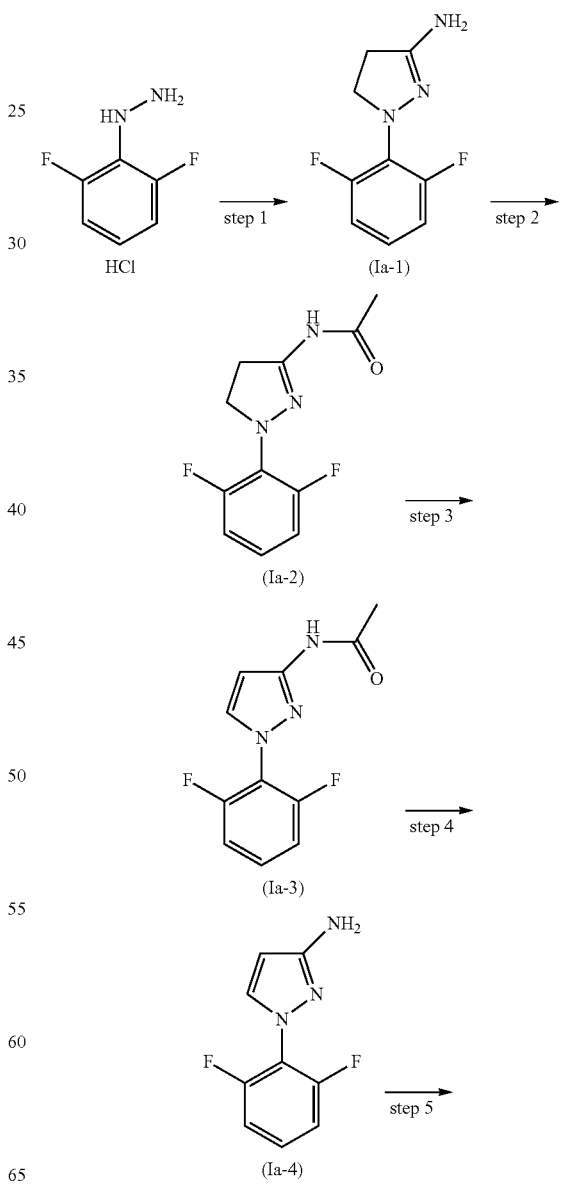

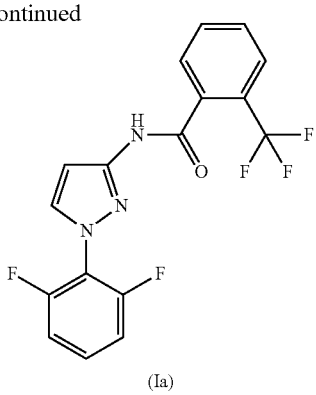

(Ia)

Step 1

1-(2,6-Difluorophenyl)-4,5-dihydro-1H-pyrazole-3-amine (intermediate (Ia-1))

2,6-Difluorophenylhydrazine hydrochloride (2.00 g) was initially charged in ethanol (20 ml), sodium ethoxide (21% in ethanol, 3.02 g) was slowly added dropwise at room temperature, the mixture was stirred for 10 min, acrylonitrile (0.80 ml) was added and the mixture was heated under reflux overnight. The reaction mixture was then concentrated under reduced pressure, taken up in dichloromethane, washed with water, dried over sodium sulphate and concentrated to dryness under reduced pressure. What remained was 1.40 g of the title compound which was used without further purification for the next step.

Step 2

N-[1-(2,6-Difluorophenyl)-4,5-dihydro-1H-pyrazol-3-yl]acetamide (intermediate (Ia-2))

With ice cooling, 1-(2,6-difluorophenyl)-4,5-dihydro-1H-pyrazole-3-amine (Ia-1) (1.40 g from previous step) was dissolved in acetic anhydride (6 ml) and stirred at room temperature overnight. The mixture was then diluted with ethyl acetate, washed with water, dried over sodium sulphate and concentrated to dryness under reduced pressure. The residue was purified by column chromatography on silica gel using the mobile phase cyclohexane/ethyl acetate (gradient=2 h from 100% cyclohexane to 100% ethyl acetate). This gave 537 mg of the title compound. HPLC-MS: logP=1.46; mass (m/z): 240.0 (M+H)+; 1H-NMR (DMSO-D6) 1.99 (s, 3H), 3.26 (t, 2H), 3.65 (t, 2H), 7.04-7.10 (m, 2H), 7.11-7.18 (m, 1H), 10.59 (br. s, 1H).

Step 3

N-[1-(2,6-Difluorophenyl)-1H-pyrazol-3-yl]acetamide (intermediate (Ia-3))

N-[1-(2,6-Difluorophenyl)-4,5-dihydro-1H-pyrazol-3-yl]acetamide (Ia-2) (200 mg) was initially charged in 1,4-dioxane (1 ml), 2,3-dichloro-5,6-dicyano-1,4-benzoquinone (209 mg) was added and the mixture was stirred at room temperature for 30 min. The reaction mixture was filtered and the filtrate was concentrated to dryness under reduced pressure. The residue was purified by column chromatography on silica gel using the mobile phase cyclohexane/ethyl acetate (gradient=2 h from 100% cyclohexane to 100% ethyl acetate). This gave 140 mg of the title compound.

HPLC-MS: logP=1.33; mass (m/z): 238.0 (M+H)+; 1H-NMR (CD3CN) 2.07 (s, 3H), 6.84 (d, 1H), 7.14–7.20 (m, 2H), 7.47–7.53 (m, 1H), 7.65–7.66 (m, 1H), 8.76 (br. s, 1H).

Step 4

1-(2,6-Difluorophenyl)-1H-pyrazole-3-amine (intermediate (Ia-4))

N-[1-(2,6-Difluorophenyl)-1H-pyrazol-3-yl]acetamide (Ia-3) (50 mg) was initially charged in water (1 ml), concentrated hydrochloric acid (0.07 ml) was added and the mixture was heated under reflux for 8 h.

The reaction mixture was then made alkaline with concentrated aqueous sodium hydroxide solution and extracted with dichloromethane. The organic phase was concentrated to dryness under reduced pressure. This gave 25 mg of the title compound.

HPLC-MS: logP=1.13; mass (m/z): 196.1 (M+H)+; 1H-NMR (CD3CN) 4.12 (br. s, 2H), 5.83 (d, 1H), 7.09–7.16 (m, 2H), 7.37–7.44 (m, 1H), 7.46–7.47 (m, 1H).

Step 5

N-[1-(2,6-difluorophenyl)-1H-pyrazol-3-yl]-2-(trifluoromethyl)benzamide (compound (Ia))

1-(2,6-Difluorophenyl)-1H-pyrazole-3-amine (Ia-4) (1 g) was initially charged in dichloromethane (10 ml). The reaction mixture was cooled down to 0° C.; 2.142 mL of triethylamine were added. Then 2-(trifluoromethyl)benzoyl chloride (1.175 g) was added dropwise with a temperature between 0° C. and 5° C. The reaction mixture was stirred overnight at room temperature. Some dichloromethane and water were then added. The organic phase was separated, dried and evaporated. The residue obtained was purified by column chromatography on silica gel using a gradient of cyclohexane/ethyl acetate. This gave 1.2 g of the title compound.

HPLC-MS: logP=2.68; mass (m/z): 368.1 (M+H)+; 1H-NMR [CD3CN] 6.99 (d, 1H), 7.16–7.22 (m, 2H), 7.47–7.54 (m, 1H), 7.65–-7.76 (m, 4H), 7.80–7.82 (m, 1H), 9.30 (br. s, 1H).

Preparation of N-[1-(3,5-difluoropyridin-2-yl)-1H-pyrazol-3-yl]-2-(trifluoromethyl)benzamide (compound (Ib))

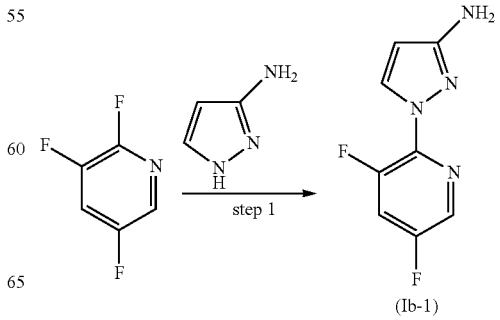

(Ib-1)

41

-continued

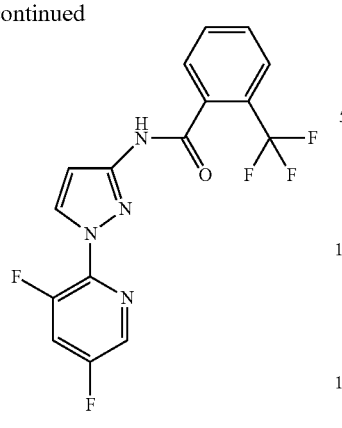

(Ib)

Step 1

1-(3,5-Difluoropyridin-2-yl)-1H-pyrazole-3-amine (intermediate (Ib-1)

1H-Pyrazole-3-amine (1.80 g) was initially charged in acetonitrile (50 ml), 2,3,5-trifluoropyridine (2.88 g) and potassium carbonate (5.99 g) were added and the mixture was heated under reflux overnight. The reaction mixture was then concentrated under reduced pressure, taken up in dichloromethane, washed with water, dried over sodium sulphate and concentrated to dryness under reduced pressure. The residue was purified by column chromatography on silica gel using the mobile phase cyclohexane/ethyl acetate (gradient=2 h from 100% cyclohexane to 100% ethyl acetate). This gave 610 mg of the title compound.

HPLC-MS: logP=0.81; mass (m/z): 197.1 (M+H)+; 1H-NMR (CD3CN) 4.27 (br. s, 2H), 5.88 (d, 1H), 7.56–7.62 (m, 1H), 7.99–8.00 (m, 1H), 8.17–8.18 (m, 1H).

Step 2

N-[1-(3,5-difluoropyridin-2-yl)-1H-pyrazol-3-yl]-2-(trifluoromethyl)benzamide (Compound (Ib))

1-(3,5-Difluoropyridin-2-yl)-1H-pyrazole-3-amine (Ib-1) (300 mg) was initially charged in dichloromethane (2 ml). The reaction mixture was cooled down to 0° C.; 0.640 ml of triethylamine were added. Then 2-(trifluoromethyl)benzoyl chloride (0.256 ml) was added dropwise with a temperature between 0° C. and 5° C. The reaction mixture was stirred overnight at room temperature. Some dichloromethane and water were then added. The organic phase was separated, dried and evaporated. The residue obtained was purified by column chromatography on silica gel using a gradient of cyclohexane/ethyl acetate. This gave 506 mg of the title compound.

HPLC-MS: logP=2.48; mass (m/z): 369.1 (M+H)+; 1H-NMR [CD3CN] 7.03 (d, 1H), 7.62–7.70 (m, 4H), 7.77–7.79 (m, 1H), 8.20 (d, 1H), 8.25 (d, 1H), 9.47 (br. s, 1H).

42

Preparation of N-[2-(2,6-Difluorophenyl)-2H-1,2,3-triazol-4-yl]-2-(trifluoromethyl)benzamide (compound (Ic))

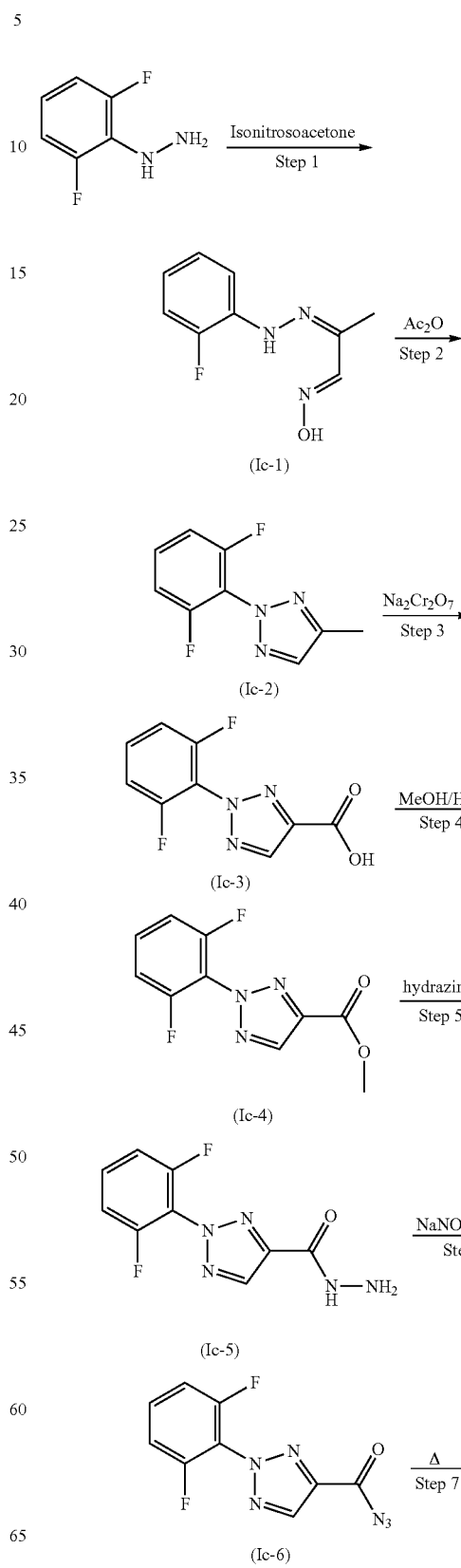

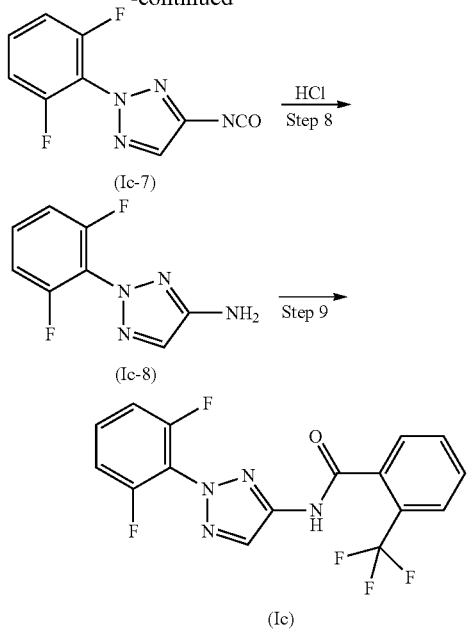

Step 4

Methyl 2-(2,6-difluorophenyl)-2H-1,2,3-triazole-4-carboxylate (intermediate (Ic-4))

Hydrogen chloride was bubbled for 2 h through a boiling solution of 2-(2,6-difluorophenyl)-2H-1,2,3-triazole-4-carboxylic acid (Ic-3) in methanol. After cooling, white crystals of the title compound were filtered off (85% of theory).

Step 5

2-(2,6-Difluorophenyl)-2H-1,2,3-triazole-4-carbohydrazide (intermediate (Ic-5))

Methyl 2-(2,6-difluorophenyl)-2H-1,2,3-triazole-4-carboxylate (Ic-4) was boiled with an excess of 1.5 eq. of hydrazine hydrate in ethanol for 4 h. After cooling, the crystals of the hydrazide (Ic-5) were boiled with water and dried. This gave the title compound (90% of theory).

Step 6

2-(2,6-Difluorophenyl)-2H-1,2,3-triazole-4-carbonyl azide (intermediate (Ic-6))

An aqueous solution of sodium nitrite was added to a suspension of 2-(2,6-Difluorophenyl)-2H-1,2,3-triazole-4-carbohydrazide (Ic-5) in 20% aqueous hydrochloric acid. After further stirring at 10° C., the crystals of the acyl azide (Ic-6) were filtered off, washed with water and dried at room temperature under reduced pressure. This gave the title compound (75% of theory).

Step 7

2-(2,6-Difluorophenyl)-2H-1,2,3-triazole-4-carbonyl isocyanate (intermediate (Ic-7))

2-(2,6-Difluorophenyl)-2H-1,2,3-triazole-4-carbonyl azide (Ic-6) dried was boiled in toluene until the evolution of gas had ended (about 2 h). The toluene was then removed on a rotary evaporator and the viscous residue of the isocyanate (Ic-7) was directly ready for the next step without further purification. This gave the title compound (90% of theory).

Step 8

2-(2,6-Difluorophenyl)-2H-1,2,3-triazole-4-amine (intermediate (Ic-8))

2-(2,6-Difluorophenyl)-2H-1,2,3-triazole-4-carbonyl isocyanate (Ic-7) was hydrolyzed by 30 min of boiling in hydrochloric acid. Residual volatile substances were removed on a rotary evaporator, and the residue was treated with sodium carbonate solution. The precipitated crystals were filtered off, washed with water and recrystallized from hexane. This gave the title compound (70% of theory).

HPLC-MS: logP=1.16; mass (m/z): 197.0 (M+H)+; 1H-NMR (CD3CN) 5.46 (b, 2H), 7.33–7.38 (m, 3H), 7.56–7.64 (m, 1H).

Step 9

N-[2-(2,6-Difluorophenyl)-2H-1,2,3-triazol-4-yl]-2-(trifluoromethyl)benzamide (compound Ic)

2, 2-(2,6-difluorophenyl)-2H-1,2,3-triazole-4-amine (Ic-8) (150 mg) was reacted with 2-(trifluoromethyl)benzoyl

Step 1

2-[2-(2,6-Difluorophenyl)hydrazinylidene]propanal oxime (intermediate (Ic-1))

0.1 mol of 2,6-difluorophenylhydrazine and 0.12 mol of isonitrosoacetone were heated under reflux in ethanol for 3 h. After cooling to room temperature, the precipitated solid was filtered off, washed with ethanol and dried. This gave the title compound (75% of theory)

Step 2

2-(2,6-Difluorophenyl)-4-methyl-2H-1,2,3-triazole (intermediate (Ic-2))

A solution of 0.1 mol of the 2-[2-(2,6-difluorophenyl)hydrazinylidene]propanal oxime (Ic-1) in acetic anhydride was heated slowly to 120° C. and stirred at this temperature for 2 h. Excess of acetic anhydride was removed on a rotary evaporator. The title compound was obtained (65% of theory) and was used without further purification.

Step 3

2-(2,6-Difluorophenyl)-2H-1,2,3-triazole-4-carboxylic acid (intermediate (Ic-3))

0.2 mol of sodium dichromate was added to a well-stirred solution of 0.1 mol of 2-(2,6-difluorophenyl)-4-methyl-2H-1,2,3-triazole (Ic-2) in 66% sulphuric acid. Each individual portion of dichromate was added only after the yellow-orange colour of the Cr6+ in the flask had disappeared. Moreover, the portions were added such that the temperature in the flask remained at about 80-90° C. The mixture was then heated for 1 h. After cooling, the mixture was poured into about the same amount of ice and allowed to stand overnight. The precipitated acid (Ic-3) was filtered off, washed with water and dried. This gave the title compound (50% of theory).

chloride (160 mg) and triethylamine (0.21 ml) in 3.9 ml of dichloromethane. Purification by column chromatography and preparative HPLC gave 143 mg of the title compound. HPLC-MS: logP=2.80; mass (m/z): 369.1 (M+H)+; 1H-NMR (CD3CN) 7.45–7.49 (m, 2H), 7.70–7.77 (m, 4H), 7.78–7.88 (m, 1H), 8.45 (s, 1H), 11.83 (s, 1H).

Use Examples

Formula for the Efficacy of the Combination of Two Compounds

The expected efficacy of a given combination of two compounds is calculated as follows (see Colby, S. R., "Calculating Synergistic and antagonistic Responses of Herbicide Combinations", Weeds 15, pp. 20-22, 1967):

If

X is the efficacy expressed in % mortality of the untreated control for test compound A at a concentration of m ppm or m g/ha, Y is the efficacy expressed in % mortality of the untreated control for test compound B at a concentration of n ppm or n g/ha, E is the efficacy expressed in % mortality of the untreated control using the mixture of A and B at m and n ppm respectively m and n g/ha, then is $$E = X + Y - \frac{X \times Y}{100}$$

If the observed insecticidal efficacy of the combination is higher than the one calculated as "E", then the combination of the two compounds is more than additive, i.e., there is a synergistic effect.

Schneider-Orelli: Formula to Calculate Corrected Efficacy % in Pesticide Trials $$\text{Corrected \%} = \left( \frac{\text{Mortality \% in treated plot} - \text{Mortality \% in control plot}}{100 - \text{Mortality \% in control plot}} \right) \times 100$$

Example A

*Meloidogyne incognita*—Test

Solvent: 125.0 parts by weight of acetone

To produce a suitable preparation of active compound, 1 part by weight of active compound is mixed with the stated amount of solvent, and the concentrate is diluted with water to the desired concentration. To produce a suitable preparation of a spore suspension the spores are diluted with water to the desired concentration.

Vessels are filled with sand, a solution of the active ingredient, a suspension containing eggs and larvae of the southern root-knot nematode (*Meloidogyne incognita*) and salad seeds. The salad seeds germinate and the seedlings grow. Galls develop in the roots.

After the specified period the nematicidal activity is determined on the basis of the percentage of gall formation. 100% means no galls were found; 0% means the number of galls found on the roots of the treated plants was equal to that in untreated control plants.

According to the present application in this test e.g. the following combinations showed a synergistic effect in comparison to the single compounds:

TABLE A

*Meloidogyne incognita* - test

| Active Ingredient | Concentration in ppm | Efficacy in % after 14$^d$ |
|---|---|---|
| Compound (Ia) | 10 | 0 |
| | 5 | 0 |
| | 1 | 0 |
| Compound (Ic) | 10 | 70 |
| | 5 | 0 |
| | 1 | 0 |
| | 0.25 | 0 |
| Abamectin | 0.08 | 0 |
| | 0.02 | 0 |

| | | obs.* | cal.** |
|---|---|---|---|
| Compound (Ia) + Abamectin | | | |
| (12.5:1) according to the invention | 1 + 0.08 | 90 | 0 |
| Compound (Ic) + Abamectin | | | |
| (12.5:1) according to the invention | 1 + 0.08 | 90 | 0 |
| | 0.25 + 0.02 | 90 | 0 |
| Azadirachtin | 16 | 0 | |
| Compound (Ia) + Azadirachtin | | | |
| (1:16) according to the invention | 1 + 16 | 90 | 0 |
| Compound (Ic) + Azadirachtin | | | |
| (1:16) according to the invention | 1 + 16 | 90 | 0 |
| Cadusafos | 100 | 0 | |
| | 50 | 0 | |
| Compound (Ia) + Cadusafos | | | |
| (1:10) according to the invention | 10 + 100 | 90 | 0 |
| | 5 + 50 | 90 | 0 |
| Compound (Ic) + Cadusafos | | | |
| (1:10) according to the invention | 5 + 50 | 70 | 0 |
| Carbofuran | 100 | 0 | |
| | 50 | 0 | |
| Compound (Ia) + Carbofuran | | | |
| (1:10) according to the invention | 10 + 100 | 90 | 0 |
| Compound (Ic) + Carbofuran | | | |
| (1:10) according to the invention | 5 + 50 | 70 | 0 |
| Iprodione | 100 | 0 | |
| | 50 | 0 | |
| Compound (Ia) + Iprodione | | | |
| (1:10) according to the invention | 10 + 100 | 90 | 0 |
| | 5 + 50 | 90 | 0 |
| Compound (Ic) + Iprodione | | | |
| (1:10) according to the invention | 10 + 100 | 100 | 70 |
| | 5 + 50 | 70 | 0 |
| Thiodicarb | 50 | 0 | |
| Compound (Ia) + Thiodicarb | | | |
| (1:10) according to the invention | 5 + 50 | 90 | 0 |
| Compound (Ic) + Thiodicarb | | | |
| (1:10) according to the invention | 5 + 50 | 90 | 0 |
| SERENADE ® soil (*Bacillus subtilis* strain (QST713)) | 200 | 0 | |

TABLE A-continued

*Meloidogyne incognita* - test

| Compound (Ia) + SERENADE ® soil (*Bacillus subtilis* strain QST713) | | | |
|---|---|---|---|
| (1:20) according to the invention | 10 + 200 | 90 | 0 |

*obs. = observed insecticidal efficacy,
**cal. = efficacy calculated with Colby-formula Example B

*Spodoptera frugiperda*—Drench Test
Solvent: 7 parts by weight of dimethylformamide
Emulsifier: 2 parts by weight of alkylaryl poly glycol ether To produce a suitable preparation of active compound, 1 part by weight of active compound is mixed with the stated amount of solvent and emulsifier and is diluted with water to the desired concentration. In the calculation of the concentration the soil volume has to be included. Care has to be taken that the emulsifier concentration in the soil does not exceed 40 ppm. Further test concentrations are prepared by dilution with water.

Corn plant leaves (*Zea mays*)) in pots filled with soil, are treated by being drenched with the preparation of the active compound of the desired concentration and are infested with caterpillars of the fall army worm (*Spodoptera frugiperda*).

After the specified period of time mortality in % is determined and corrected according to Schneider-Orelli's formula (see sheet 1). 100% means all the caterpillars have been killed and 0% means none of the caterpillars have been killed. The mortality values determined thus are recalculated using the Colby-formula (see sheet 1).

According to the present application in this test e.g. the following combinations showed a synergistic effect in comparison to the single compounds:

TABLE B-1

*Spodoptera frugiperda* - drench test

| Active Ingredient | Concentration in ppm | Efficacy in % after $4^d$ | |
|---|---|---|---|
| Compound (Ia) | 200 | 0 | |
| Compound (Ic) | 200 | 0 | |
| Compound (Ib) | 200 | 0 | |
| Clothianidin | 10 | 0 | |
| | | obs.* | cal.** |
| Compound (Ic) + Clothianidin | | | |
| (20:1) according to the invention | 200 + 10 | 66 | 0 |
| Compound (Ib) + Clothianidin | | | |
| (20:1) according to the invention | 200 + 10 | 89 | 0 |
| Imidacloprid | 50 | 22 | |
| Compound (Ia) + Imidacloprid | | | |
| (4:1) according to the invention | 200 + 50 | 55 | 22 |
| Compound (Ic) + Imidacloprid | | | |
| (4:1) according to the invention | 200 + 50 | 55 | 22 |

TABLE B-2

*Spodoptera frugiperda* - drench test

| Active Ingredient | Concentration in ppm | Efficacy in % after $6^d$ | |
|---|---|---|---|
| Compound (Ia) | 200 | 0 | |
| Compound (Ic) | 200 | 0 | |
| Compound (Ib) | 200 | 0 | |
| Imidacloprid | 50 | 12 | |
| | 10 | 0 | |
| | | obs.* | cal.** |
| Compound (Ia) + Imidacloprid | | | |
| (4:1) according to the invention | 200 + 50 | 49 | 12 |
| Compound (Ic) + Imidacloprid | | | |
| (4:1) according to the invention | 200 + 50 | 100 | 12 |
| (20:1) according to the invention | 200 + 10 | 49 | 0 |
| Compound (Ib) + Imidacloprid | | | |
| (4:1) according to the invention | 200 + 50 | 88 | 12 |
| (20:1) according to the invention | 200 + 10 | 49 | 0 |
| Clothianidin | 10 | 37 | |
| | 2 | 0 | |
| Compound (Ia) + Clothianidin | | | |
| (20:1) according to the invention | 200 + 10 | 88 | 37 |
| Compound (Ic) + Clothianidin | | | |
| (20:1) according to the invention | 200 + 10 | 74 | 37 |
| Compound (Ib) + Clothianidin | | | |
| (20:1) according to the invention | 200 + 10 | 88 | 37 |
| (100:1) according to the invention | 200 + 2 | 37 | 0 |

TABLE B-3

*Spodoptera frugiperda* - drench test

| Active Ingredient | Concentration in ppm | Efficacy in % after $14^d$ | |
|---|---|---|---|
| Compound (Ia) | 40 | 0 | |
| | 0.2 | 0 | |
| Compound (Ic) | 0.8 | 0 | |
| | 0.2 | 0 | |
| Compound (Ib) | 40 | 0 | |
| Chlorantraniliprole | 0.04 | 66.5 | |
| | | obs.* | cal.** |
| Compound (Ia) + Chlorantraniliprole | | | |
| (5:1) according to the invention | 0.2 + 0.04 | 100 | 66.5 |
| Compound (Ic) + Chlorantraniliprole | | | |
| (5:1) according to the invention | 0.2 + 0.04 | 100 | 66.5 |
| Cyantraniliprole | 0.08 | 16.5 | |
| Compound (Ic) + Cyantraniliprole | | | |
| (10:1) according to the invention | 0.8 + 0.08 | 66 | 16.5 |
| Flubendiamide | 8 | 66 | |
| | 4 | 33 | |

TABLE B-3-continued

*Spodoptera frugiperda* - drench test

Compound (Ia) + Flubendiamide

| | | | |
|---|---|---|---|
| (10:1) according to the invention | 40 + 4 | 83 | 33 |
| Compound (Ib) + Flubendiamide | | | |
| (5:1) | 40 + 8 | 100 | 66 |
| (10:1) according to the invention | 40 + 4 | 100 | 33 |

*obs. = observed insecticidal efficacy,
**cal. = efficacy calculated with Colby-formula Example C

*Meloidogyne incognita*—Drench Test

Solvent: 7 parts by weight of dimethylformamide
Emulsifier: 2.5 parts by weight of alkylarylpolyglycolether To produce a suitable preparation of active compound, 1 part by weight of active compound is mixed with the stated amount of solvent and emulsifier and is diluted with water to the desired concentration. In the calculation of the concentration the soil volume has to be included. Care has to be taken that the emulsifier concentration in the soil does not exceed 20 ppm. Further test concentrations are prepared by dilution with water.

The compound solution is poured into pots filled with soil (loamy sand). A suspension containing eggs and larvae of the southern root-knot nematode (*Meloidogyne incognita*) is added, salad seeds are spread on the soil surface and covered with quartz sand. The salad seeds germinate and the seedlings grow. Galls develop on the roots.

After the specified period of time the nematicidal activity is determined on the basis of the percentage of gall formation. 100% means no galls were found; 0% means the number of galls found on the roots of the treated plants was equal to that in untreated control plants. The activity determined thus is recalculated using the Colby-formula (see sheet 1).

According to the present application in this test e.g. the following combinations showed a synergistic effect in comparison to the single compounds:

TABLE C

*Meloidogyne incognita* - drench test

| Active Ingredient | Concentration in ppm | Efficacy in % after 21$^d$ | |
|---|---|---|---|
| Compound (Ia) | 0.75 | 0 | |
| Compound (Ib) | 0.75 | 55 | |
| Fluopyram | 0.15 | 0 | |
| | | obs.* | cal.** |
| Compound (Ia) + Fluopyram | | | |
| (5:1) according to the invention | 0.75 + 0.15 | 97 | 0 |
| Compound (Ib) + Fluopyram | | | |
| (5:1) according to the invention | 0.75 + 0.15 | 95 | 55 |

*obs. = observed insecticidal efficacy,
**cal. = efficacy calculated with Colby-formula Example D

*Myzus persicae*—Drench Test

Solvent: 7 parts by weight of dimethylformamide
Emulsifier: 2 parts by weight of alkylaryl poly glycol ether To produce a suitable preparation of active compound, 1 part by weight of active compound is mixed with the stated amount of solvent and emulsifier and is diluted with water to the desired concentration. In the calculation of the concentration the soil volume has to be included. Care has to be taken that the emulsifier concentration in the soil does not exceed 40 ppm. Further test concentrations are prepared by dilution with water.

Cabbage plants (*Brassica oleracea*)) in pots filled with soil, which are heavily infested with the green peach aphid (*Myzus persicae*), are treated by being drenched with the preparation of the active compound of the desired concentration.

After the specified period of time mortality in % is determined. 100% means all the aphids have been killed and 0% means none of the aphids have been killed. The mortality values determined thus are recalculated using the Colby-formula (see sheet 1).

According to the present application in this test e.g. the following combinations showed a synergistic effect in comparison to the single compounds:

TABLE D-1

*Myzus persicae* - drench test

| Active Ingredient | Concentration in ppm | Efficacy in % after 7$^d$ | |
|---|---|---|---|
| Compound (Ia) | 20 | 0 | |
| | 2 | 0 | |
| Compound (Ic) | 20 | 0 | |
| | 2 | 0 | |
| Compound (Ib) | 20 | 0 | |
| | 2 | 0 | |
| N-[1-[(6-chloro-3-pyridinyl)methyl]-2(1H)-pyridinylidene]-2,2,2-trifluoro-acetamide | 0.1 | 30 | |
| | | obs.* | cal.** |
| Compound (Ib) + N-[1-[(6-chloro-3-pyridinyl)methyl]-2(1H)-pyridinylidene]-2,2,2-trifluoro-acetamide | | | |
| (20:1) according to the invention | 2 + 0.1 | 70 | 30 |
| 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | 0.25 | 0 | |
| Compound (Ia) + 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | | | |
| (8:1) according to the invention | 2 + 0.25 | 60 | 0 |
| Compound (Ic) + 1-(3-chloropyridin-2-yl)-N-[4-cyano-2-methyl-6-(methylcarbamoyl)phenyl]-3-{[5- | | | |

TABLE D-1-continued

*Myzus persicae* - drench test

| | | | |
|---|---|---|---|
| (trifluoromethyl)-2H-tetrazol-2-yl]methyl}-1H-pyrazole-5-carboxamide | | | |
| (8:1) according to the invention | 2 + 0.25 | 85 | 0 |
| Chlorantraniliprole | 1.6 | 20 | |
| | 0.8 | 10 | |
| Compound (Ia) + Chlorantraniliprole | | | |
| (1.25:1) according to the invention | 2 + 1.6 | 50 | 20 |
| Compound (Ic) + Chlorantraniliprole | | | |
| (1.25:1) | 2 + 1.6 | 60 | 20 |
| (2.5:1) according to the invention | 2 + 0.8 | 45 | 10 |
| Compound (Ib) + Chlorantraniliprole | | | |
| (1.25:1) | 2 + 1.6 | 95 | 20 |
| (2.5:1) according to the invention | 2 + 0.8 | 60 | 10 |
| Cyantraniliprole | 0.1 | 20 | |
| Compound (Ic) + Cyantraniliprole | | | |
| (20:1) according to the invention | 2 + 0.1 | 75 | 20 |
| Compound (Ib) + Cyantraniliprole | | | |
| (20:1) according to the invention | 2 + 0.1 | 55 | 20 |
| Fipronil | 10 | 40 | |
| | 5 | 15 | |
| Compound (Ia) + Fipronil | | | |
| (2:1) | 20 + 10 | 80 | 40 |
| (4:1) according to the invention | 20 + 5 | 80 | 15 |
| Compound (Ic) + Fipronil | | | |
| (2:1) | 20 + 10 | 75 | 40 |
| (4:1) according to the invention | 20 + 5 | 70 | 15 |
| Compound (Ib) + Fipronil | | | |
| (2:1) | 20 + 10 | 80 | 40 |
| (4:1) according to the invention | 20 + 5 | 80 | 15 |

TABLE D-2

*Myzus persicae* - drench test

| Active Ingredient | Concentration in ppm | Efficacy in % after 10$^d$ | |
|---|---|---|---|
| Compound (Ia) | 20 | 0 | |
| | 2 | 0 | |
| Compound (Ic) | 2 | 0 | |
| Compound (Ib) | 2 | 0 | |
| N-[1-[(6-chloro-3-pyridinyl)methyl]-2(1H)-pyridinylidene]-2,2,2-trifluoro-acetamide | 0.1 | 20 | |
| | | obs.* | cal.** |
| Compound (Ib) + N-[1-[(6-chloro-3-pyridinyl)methyl]-2(1H)-pyridinylidene]-2,2,2-trifluoro-acetamide | | | |
| (20:1) according to the invention | 2 + 0.1 | 50 | 20 |
| 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | 0.25 | 0 | |
| Compound (Ia) + 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | | | |
| (8:1) according to the invention | 2 + 0.25 | 90 | 0 |
| Compound (Ic) + 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | | | |
| (8:1) according to the invention | 2 + 0.25 | 90 | 0 |
| Compound (Ib) + 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide | | | |
| (8:1) according to the invention | 2 + 0.25 | 30 | 0 |
| Chlorantraniliprole | 0.4 | 0 | |
| Compound (Ic) + Chlorantraniliprole | | | |
| (5:1) according to the invention | 2 + 0.4 | 40 | 0 |
| Compound (Ib) + Chlorantraniliprole | | | |
| (5:1) according to the invention | 2 + 0.4 | 45 | 0 |
| Cyantraniliprole | 0.1 | 10 | |
| Compound (Ia) + Cyantraniliprole | | | |
| (1.25:1) according to the invention | 2 + 0.1 | 55 | 10 |
| Compound (Ic) + Cyantraniliprole | | | |
| (20:1) according to the invention | 2 + 0.1 | 70 | 10 |
| Compound (Ib) + Cyantraniliprole | | | |
| (20:1) according to the invention | 2 + 0.1 | 40 | 10 |
| Fipronil | 10 | 55 | |
| | 5 | 50 | |
| Compound (Ia) + Fipronil | | | |
| (2:1) | 20 + 10 | 90 | 55 |
| (4:1) according to the invention | 20 + 5 | 90 | 50 |

*obs. = observed insecticidal efficacy,
**cal. = efficacy calculated with Colby-formula Example E

*Tetranychus urticae*—Drench Test; OP-Resistant
Solvent: 7 parts by weight of dimethylformamide
Emulsifier: 2 parts by weight of alkylaryl poly glycol ether To produce a suitable preparation of active compound, 1 part by weight of active compound is mixed with the stated amount of solvent and emulsifier and is diluted with water to the desired concentration. In the calculation of the concentration the soil volume has to be included. Care has to be taken that the emulsifier concentration in the soil does not exceed 40 ppm. Further test concentrations are prepared by dilution with water.

Bean plants (*Phaseolus vulgaris*) in pots filled with soil, which are heavily infested with all stages of the two-spotted spider mite (*Tetranychus urticae*), are treated by being drenched with the preparation of the active compound of the desired concentration.

After the specified period of time mortality in % is determined. 100% means all the spider mites have been killed and 0% means none of the spider mites have been killed. The mortality values determined thus are recalculated using the Colby-formula (see sheet 1).

According to the present application in this test e.g. the following combinations showed a synergistic effect in comparison to the single compounds:

TABLE E

*Tetranychus urticae* - drench test

| Active Ingredient | Concentration in ppm | Efficacy in % after 15$^d$ | |
|---|---|---|---|
| Compound (Ia) | 25 | 10 | |
| Compound (Ic) | 25 | 0 | |
| Compound (Ib) | 25 | 0 | |
| Emamectin-benzoate | 2 | 10 | |
| | | obs.* | cal.** |
| Compound (Ia) + Emamectin-benzoate | | | |
| (12.5:1) according to the invention | 25 + 2 | 75 | 19 |
| Compound (Ic) + Emamectin-benzoate | | | |
| (12.5:1) according to the invention | 25 + 2 | 85 | 10 |
| Compound (Ib) + Emamectin-benzoate | | | |
| (12.5:1) according to the invention | 25 + 2 | 55 | 10 |

*obs. = observed insecticidal efficacy,
**cal. = efficacy calculated with Colby-formula

The invention claimed is:

1. An active ingredient combination comprising a compound of the formula (I)

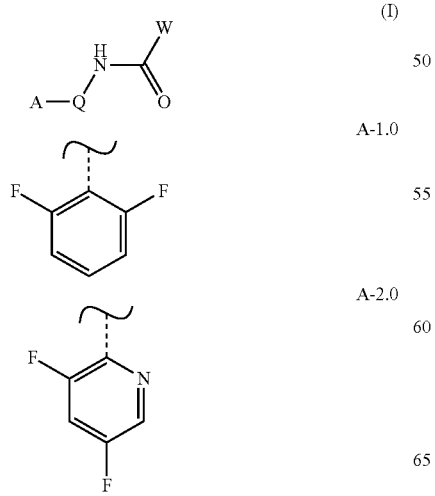

in which A is A-1.0 or A-2.0 in which the dotted line represents the bond to the N atom of Q;

Q is Q-1.0 or Q-2.0 in which the nitrogen is attached to ring A and the arrow in each case represents the bond to the NHCO moiety;

with the proviso that if A represents A-1.0 then Q represents Q-1.0

W represents a radical from the group consisting of W1 to W11

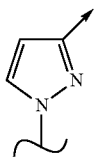
Q-1.0

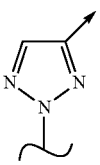
Q-2.0

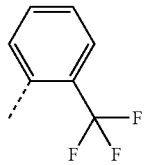
W1

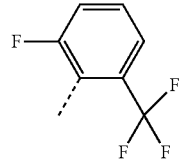
W2

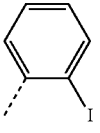
W3

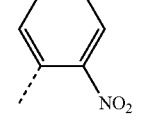
W4

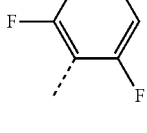
W5

W6

W7

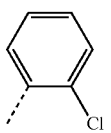

W8

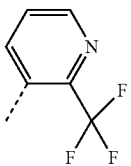

W9

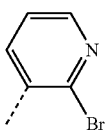

W10

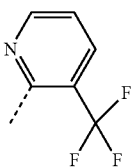

W11

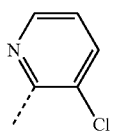

and one or more than one compound/biological control agent selected from the mixing partners identified in the table below:

| No. | Mixing partner |
|---|---|
| 1. | Imidacloprid |
| 2. | Clothianidin |
| 3. | Thiacloprid |
| 4. | Sulfoxaflor |
| 5. | Flupyradifurone 4-{[(6-chloropyrid-3-yl)methyl](2,2-difluoroethyl)amino}furan-2(5H)-one |
| 6. | Carbofuran |
| 7. | Thiodicarb |
| 8. | Oxamyl |
| 9. | Cadusafos |
| 10. | Fosthiazate |
| 11. | Imicyafos |
| 12. | Tefluthrin |
| 13. | Chlorantraniliprole (FCH 1557) |
| 14. | Cyantraniliprole (FCH 1706) |
| 15. | Flubendiamide |
| 16. | 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide |
| 17. | Fipronil |
| 18. | Ethiprole |
| 19. | Abamectin |
| 20. | Emamectin-benzoate |
| 21. | Fluensulfone |
| 22. | Dimethyl-disulfide |
| 23. | 1-{2-fluoro-4-methyl-5-[(2,2,2-trifluoroethyl)sulfinyl]phenyl}-3-(trifluoromethyl)-1H-1,2,4-triazol-5-amine |
| 24. | Triflumezopyrim |
| 25. | Iprodione |
| 26. | Fluopyram |
| 27. | 8-chloro-N-[(2-chloro-5-methoxyphenyl)sulfonyl]-6-(trifluoromethyl)imidazo[1,2-a]pyridine-2-carboxamide |
| 28. | Tioxazafen |
| 29. | *Pasteuria penetrans* |
| 30. | *Pasteuria nishizawae* |
| 31. | *Pasteuria usage* |
| 32. | *Pasteuria* spp. Pr3 |
| 33. | *Myrothecium verrucaria* |
| 34. | *Flavobacterium* MBI-302 |
| 35. | SERENADE ® soil/DPZ ™ (*Bacillus subtilis* strain QST713) |
| 36. | Paecilomyces lilacinus |
| 37. | *Bacillus firmus* I-1582 |
| 38. | Azadirachtin. |

2. The active ingredient combination according to claim 1, where in the formula (I) A is A-1.0, Q is Q-1.0 and W is W1.

3. Active ingredient combinations according to claim 1, in which besides the compound of the formula (I) there is only one (1) compound/biological control agent selected from the compounds identified in the table.

4. A method comprising treating animal pests with the active ingredient combination according to claim 1.

5. A method comprising treating seed, soil, and/or plats with the active ingredient combination according to claim 1.

6. A method comprising treating transgenic plants with the active ingredient combination according to claim 1.

7. A composition containing an active ingredient combination according to claim 1 and one or more than one extender and/or one or more than one surfactant.

8. A method for producing a crop protection composition, comprising mixing an active ingredient combination according to claim 1 with one or more than one extender and/or one or more than one surfactant.

9. A method for controlling animal pest comprising treating the animal pest with the active ingredient combination according to claim 1.

10. The active ingredient combination according to claim 1, wherein the active ingredient combination is synergistically active.

11. The active ingredient combination according to claim 1, wherein a ratio of the compound of formula (I) to the one or more than one compound/biological agent is in a range of from 2000:1 to 1:2000.

12. The active ingredient combination according to claim 1, wherein a ratio of the compound of formula (I) to the one or more than one compound/biological agent is in a range of from 100:1 to 1:100.

13. The active ingredient combination according to claim 1, wherein a ratio of the compound of formula (I) to the one or more than one compound/biological agent is in a range of from 30:1 to 1:30.

14. The active ingredient combination according to claim 1, wherein the one or more than one compound/biological control agent is abamectin, azadirachtin, cadusafos, carbofuran, iprodione, thiodicarb or bacillus subtilis strain QST 713 and wherein a ratio of the compound of formula (I) to the one or more than one compound/biological agent is in a range of from 20:1 to 1:20.

15. The active ingredient combination according to claim 1, wherein the one or more than one compound/biological control agent is clothianidin, imidacloprid, chlorantraniliprole, cyantraniliprole, or flubendiamide, and wherein a ratio of the compound of formula (I) to the one or more than one compound/biological agent is in a range of from 100:1 to 1:1.

16. The active ingredient combination according to claim 1, wherein the one or more than one compound/biological control agent is fluopyram,
and wherein a ratio of the compound of formula (I) to fluopyram is in a range of from 15:1 to 1:1.

17. The active ingredient combination according to claim 1, wherein the one or more than one compound/biological control agent is 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide, chlorantraniliprole, cyantraniliprole, or fipronil,
and wherein a ratio of the compound of formula (I) to the one or more than one compound/biological agent is in a range of from 20:1 to 1:1.

18. The active ingredient combination according to claim 1, wherein the one or more than one compound/biological control agent is emamectin-benzoate,
and wherein a ratio of the compound of formula (I) to emamectin-benzoate is in a range of from 15:1 to 1:1.

* * * * *